(12) United States Patent
Pan et al.

(10) Patent No.: US 10,417,049 B2
(45) Date of Patent: Sep. 17, 2019

(54) INTRA-CODE COMMUNICATION IN A LOCALIZED DEVICE COORDINATOR

(71) Applicant: Amazon Technologies, Inc., Seattle, WA (US)

(72) Inventors: Cheng Pan, Bellevue, WA (US); Calvin Yue-Ren Kuo, Mercer Island, WA (US); Jonathan I. Turow, Seattle, WA (US); Marc John Brooker, Seattle, WA (US); James Christopher Sorenson, III, Seattle, WA (US); Weili Zhong McClenahan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 15/362,708

(22) Filed: Nov. 28, 2016

(65) Prior Publication Data
US 2018/0150339 A1 May 31, 2018

(51) Int. Cl.
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| 6,256,498 | B1 | 7/2001 | Ludwig |
| 8,339,259 | B1 | 12/2012 | Biere et al. |
| 9,122,651 | B1 | 9/2015 | Baulier et al. |
| 9,146,764 | B1 * | 9/2015 | Wagner ............... G06F 9/45533 |

(Continued)

FOREIGN PATENT DOCUMENTS

| WO | WO 2018/098366 A1 | 5/2018 |
| WO | WO 2018/098443 A1 | 5/2018 |

OTHER PUBLICATIONS

Kim, "Developing an On-Demand Cloud-Based Sensing-as-a-Service System for Internet of Things," vol. 2016, Article 3292783, pp. 1-17.

(Continued)

*Primary Examiner* — Tuan C Dao
*Assistant Examiner* — William C Wood
(74) *Attorney, Agent, or Firm* — Knobbe, Martens, Olson & Bear, LLP

(57) ABSTRACT

Systems and methods are described for implementing a coordinator within a coordinated environment, which environment includes set of coordinated devices managed by the coordinator. The coordinator can be provisioned with a set of tasks, each task corresponding to a segment of code that can be executed by the coordinator, such as to manage the coordinated devices. To assist in execution of the tasks, the coordinator can include a communications manager that enables communications between tasks. The communications manager can provide a language-independent interface to call for execution of tasks, pass information to a task, and obtain outputs of a task. In some embodiments, the communication manager may utilize a language-independent protocol, such as the hypertext transport protocol, and be configured to respond to requests addressed to uniform resource identifiers associated with the communications manager.

18 Claims, 17 Drawing Sheets

(56) References Cited

U.S. PATENT DOCUMENTS

| | | | |
|---|---|---|---|
| 9,317,318 B2 | 4/2016 | Zheng et al. | |
| 9,606,817 B1 | 3/2017 | Efstathopoulos | |
| 2002/0184070 A1* | 12/2002 | Chen | G06Q 10/06311 705/7.13 |
| 2005/0132368 A1 | 6/2005 | Sexton et al. | |
| 2005/0198365 A1* | 9/2005 | Wei | G06F 17/2247 709/237 |
| 2008/0248801 A1 | 10/2008 | Fletcher et al. | |
| 2010/0064208 A1 | 3/2010 | Valtchev et al. | |
| 2011/0061062 A1* | 3/2011 | Chu | G06F 9/546 719/314 |
| 2012/0060171 A1 | 3/2012 | Bobroff et al. | |
| 2012/0233248 A1* | 9/2012 | Zou | H04L 47/125 709/203 |
| 2013/0018960 A1 | 1/2013 | Knysz et al. | |
| 2013/0191542 A1 | 7/2013 | Matczynski et al. | |
| 2013/0198319 A1 | 8/2013 | Shen et al. | |
| 2013/0219385 A1 | 8/2013 | Geibel et al. | |
| 2014/0115655 A1 | 4/2014 | Marvais et al. | |
| 2014/0317738 A1* | 10/2014 | Be'ery | H04L 63/14 726/23 |
| 2014/0324973 A1 | 10/2014 | Goel et al. | |
| 2015/0006296 A1 | 1/2015 | Gupta et al. | |
| 2015/0019342 A1 | 1/2015 | Gupta | |
| 2015/0271150 A1 | 9/2015 | Barnett et al. | |
| 2016/0092251 A1 | 3/2016 | Wagner | |
| 2016/0105691 A1 | 4/2016 | Zucchetta | |
| 2016/0149917 A1 | 5/2016 | Tanaka | |
| 2016/0226937 A1 | 8/2016 | Patel et al. | |
| 2016/0255167 A1 | 9/2016 | Green et al. | |
| 2016/0259932 A1 | 9/2016 | Lakshmanan et al. | |
| 2016/0291959 A1 | 10/2016 | Searle et al. | |
| 2017/0006030 A1 | 1/2017 | Krishnamoorthy et al. | |
| 2017/0026321 A1 | 1/2017 | Ciavatta | |
| 2017/0093915 A1 | 3/2017 | Ellis et al. | |
| 2017/0139925 A1 | 5/2017 | Shah et al. | |
| 2017/0155703 A1 | 6/2017 | Hao et al. | |
| 2017/0168777 A1 | 6/2017 | Britt | |
| 2017/0187597 A1 | 6/2017 | Nolan et al. | |
| 2017/0280279 A1 | 9/2017 | Ghosh et al. | |
| 2018/0034913 A1 | 2/2018 | Matthieu et al. | |
| 2018/0109395 A1 | 4/2018 | Berdy et al. | |
| 2018/0150317 A1 | 5/2018 | Kuo et al. | |
| 2018/0150318 A1 | 5/2018 | Kuo et al. | |
| 2018/0150325 A1 | 5/2018 | Kuo et al. | |
| 2018/0150341 A1 | 5/2018 | Pan et al. | |
| 2018/0152401 A1 | 5/2018 | Tandon et al. | |
| 2018/0152405 A1 | 5/2018 | Kuo et al. | |
| 2018/0152406 A1 | 5/2018 | Kuo et al. | |

OTHER PUBLICATIONS

International Search Report and Written Opinion in PCT/US2017/063138 dated Mar. 6, 2018.
International Search Report and Written Opinion in PCT/US2017/063302 dated Mar. 9, 2018.
U.S. Appl. No. 15/362,709, Localized Device Coordinator With On-Demand Code Execution Capabilities, filed Nov. 28, 2016.
U.S. Appl. No. 15/362,691, Localized Device Coordinator, filed Nov. 28, 2016.
U.S. Appl. No. 15/362,751, Managing Security in Messaging Protocol Communications, filed Nov. 28, 2016.
U.S. Appl. No. 15/362,757, Embedded Codes in Messaging Protocol Communications, filed Nov. 28, 2016.
U.S. Appl. No. 15/362,765, Managing Messaging Protocol Communications, filed Nov. 28, 2016.
U.S. Appl. No. 15/362,696, On-Demand Code Execution in a Localized Device Coordinator, filed Nov. 28, 2016.
U.S. Appl. No. 15/362,707, Remote Invocation of Code Execution in a Localized Device Coordinator, filed Nov. 28, 2016.
International Search Report and Written Opinion in PCT/US2017/063314 dated Feb. 9, 2018.
Corbin, "MQTT is the de-facto standard and ISO standard for messaging protocols", Jul. 1, 2016, developer.ibm.com, 4 pages.
Wikipedia, "Create, Read, Update, and Delete", saved Oct. 1, 2018, en.wikipedia.com, 3 pages.

* cited by examiner

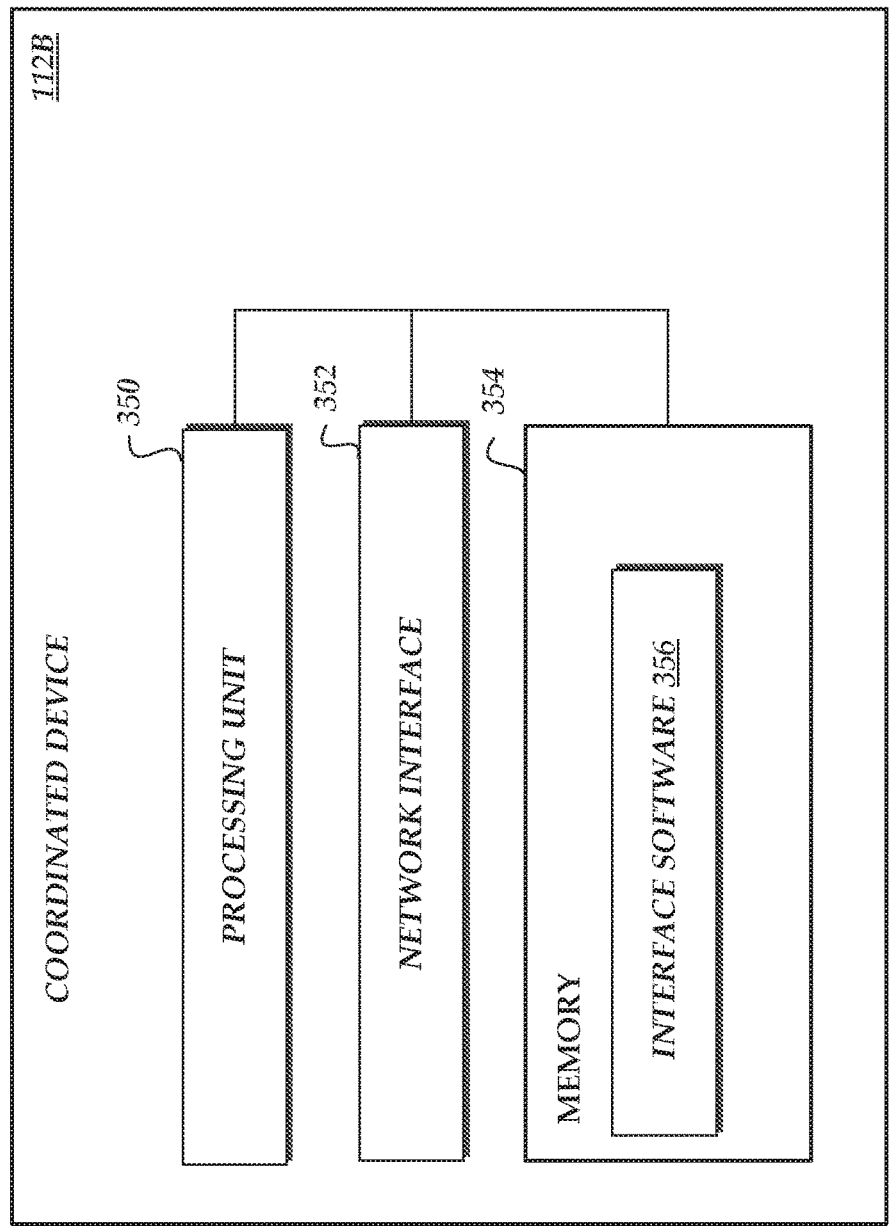

INTRA-CODE COMMUNICATION IN A LOCALIZED DEVICE COORDINATOR

CROSS-REFERENCE TO RELATED APPLICATION

This application is related to: U.S. patent application Ser. No. 15/362,751, filed on Nov. 28, 2016, and entitled "MANAGING SECURITY IN MESSAGING PROTOCOL COMMUNICATIONS"; U.S. patent application Ser. No. 15/362,757, filed on Nov. 28, 2016, and entitled "EMBEDDED CODES IN MESSAGING PROTOCOL COMMUNICATIONS"; and U.S. patent application Ser. No. 15/362,765, filed on Nov. 28, 2016, and entitled "MANAGING MESSAGING PROTOCOL COMMUNICATIONS" (hereinafter, collectively, the "Related Applications"). The entirety of each of the Related Applications is hereby incorporated by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality. In some instances, the local user interfaces of these embedded devices or thin devices are limited, and thus remote management may be required to implement some functions of these devices. However, remote management can in some instances be problematic, due to latency in communications with a remote management device and potential for private information to be inadvertently disclosed either at the remote management device or during communications with the remote management device. These issues may be more prevalent when the embedded devices or thin devices and the remote management device exist on separate communication networks or communicate over public communications networks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 3A and 3B depict general architectures of coordinated devices managed by the coordinator of FIG. 1;

DETAILED DESCRIPTION

Figure 1:
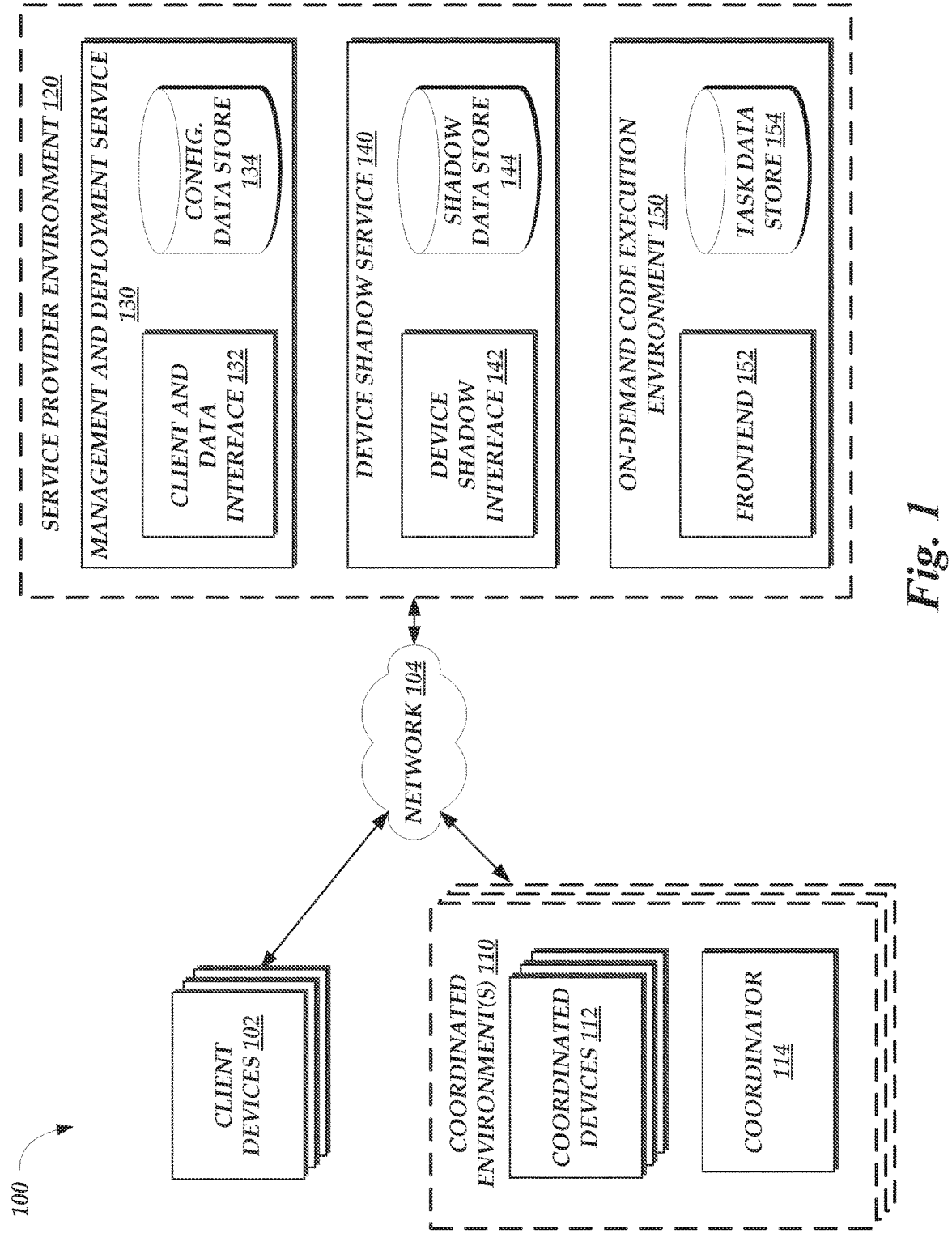
FIG. 1 is a block diagram depicting an illustrative environment in which a coordinator can operate to locally manage and coordinate operation of coordinated devices within a coordinated environment, and wherein the coordinator may communicate with client devices and a service provider environment to modify operation of the coordinator.

Generally described, aspects of the present disclosure relate to a coordinator present within a coordinated environment to control operation and functionality of coordinated devices within the coordinated environment. In some instances, coordinated devices may correspond to embedded devices or thin devices that have at least one alternative primary function, such as household appliances having a separate primary purpose. Such devices may in some instances be referred to as "Internet-of-Things" devices, or "IoT" devices. Coordinated devices may include limited local user interface capabilities, and may thus benefit from remote management. The coordinator disclosed herein enables such remote management of coordinated devices locally, within an environment including the coordinator and the coordinated devices (such as a local area network, or "LAN," environment). Use of a coordinator can thus enable management of coordinated devices without requiring communications external to the local environment, thereby allowing a reduction in privacy risks and an increase in communication speed over the use of external or public communication networks. Specifically, aspects of the present disclosure relate to the utilization of a coordinator as a localized on-demand code execution system, enabling rapid execution of portable segments of code to implement functions on the coordinator. These portable segments of code may be referred to herein as "tasks." In some instances, tasks may be utilized to coordinate functionality of a coordinated device, such as by changing the state of the device. For example, where a coordinated device is a network-enabled light, a task may function to change the state of the light (e.g., to "on" or "off") according to an input to the coordinator, such as the current time, a user input, or the state of another coordinated device. The coordinator may further enable communication coordinated devices and tasks according to a number of different protocols, and in some instances provide translation functions between such protocols. Still further, the coordinator may in some instances manage an execution location of a task, such that the task may be executed on the coordinator, on a coordinated device, or on a device of a remote environment (e.g., a remote network computing environment), according to capabilities of candidate devices and requirements for execution of the task. These tasks may in some instances be user-defined, enabling users to implement a variety of functionalities on the coordinator or coordinated devices, according to user-submitted code corresponding to the task. Thus, a coordinator may provide rapidly reconfigurable localized management of coordinated devices.

In some instances, the coordinator may manage a state of coordinated device via a "device shadow." In general, device shadows may correspond to a data representation of a desired state of a coordinated device, as stored at a location remote from the coordinated device (e.g., a coordinator or a remote device shadow service). A coordinated device may be configured to synchronize with the state represented by a device shadow, and as such, a change to the device shadow may be expected to cause a corresponding change in the state of a coordinated device. In some instances, synchronization of a coordinated device and a corresponding shadow may occur via a "publish/subscribe" model communication protocol, such as the MQTT protocol, which protocol is known in the art. Accordingly, a coordinated device may "subscribe" to a device shadow for that coordinated device. The coordinator may then obtain desired changes to the state of a device shadow via requests to "publish" to the device shadow. The coordinator may notify the coordinated device via the communication protocol of the change in state of the device shadow, and the coordinated device may respond by synchronizing a local state to the state of the device shadow. Use of device shadows may be advantageous, for example, in decoupling requests to read or modify the state of a coordinated device from communications with the coordinated device. Illustratively, requests to read or modify the state of a coordinated device may be considered successful immediately, on reading or modifying the device shadow. Any changes necessary to the coordinated device may then occur asynchronously to the request, according to the communication protocol between the coordinated device and the shadow device. Because requests to interact with the device may be decoupled from actual communications with the device, these requests and device communications may also utilize different communication protocols. For example, requests to read or modify a device state via a device shadow may be transmitted according to a high-overhead, high-reliability protocol, such as the Transmission Control Protocol (TCP), while communications between the device shadow and the coordinated device may occur via a low-overhead protocol such as MQTT. Further details regarding the MQTT to transmit communications to coordinated devices can be found within U.S. patent application Ser. No. 15/249,213, entitled "EXECUTING REMOTE COMMANDS," and filed Aug. 26, 2016 (the '213 application), the entirety of which is incorporated by reference herein. In some instances, utilization of a device shadow may provide other benefits, such as reducing the computational resources used by the coordinated device. For example, the coordinated device may not be required to process or even be aware of requests to read the coordinated device's state, as such requests can be handled by a host of the corresponding device shadow (e.g., the coordinated device). Further details regarding the use of device shadows generally can be found within U.S. patent application Ser. No. 15/196,700, entitled "Device Representation Management Using Representation Types," and filed Jun. 29, 2016 (the "'700 application"), the entirety of which is incorporated by reference herein.

In accordance with embodiments of the present disclosure, a coordinator may be associated with a user, who may alter the configuration of the coordinator via an environment of a service provider. Illustratively, the service provider environment may be operated by a provider of the coordinator, and enable a user to specify various configuration parameters of the coordinator, such as the location of a coordinated environment for the coordinator, the coordinated devices within the environment, the tasks executable by a coordinator, how the coordinator should manage communications between devices, between tasks, or between devices and tasks, security information for the coordinator, or other parameters of the coordinator (such as metrics to be monitored at a coordinator or logging to be conducted at the coordinator). Because the coordinator itself may in some instances be associated with limited localized user interfaces, the service provider environment by enable a user, via a client device, to submit a configuration for the coordinator, and to cause the coordinator to be automatically provisioned with the configuration. The service provider environment may further enable a single client device to manage multiple coordinators via a unified interface, and to quickly alter the configuration of a coordinator by deploying a new configuration, or by rolling-back or undoing prior deployments of configurations to the coordinator.

In some instances, the service provider environment may provide functionalities similar or identical to the functionalities of the coordinator. For example, a coordinator may function at least in part based on execution of portable segments of code, or "tasks." Similarly, a server provider environment may include an on-demand code execution environment that functions to execute the same or similar tasks. Further details regarding such an on-demand code execution environment can be found within U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 patent"), the entirety of which is hereby incorporated by reference. In brief, to execute tasks, an on-demand code execution environment may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced. The on-demand code execution environment may include a virtual machine instance manager, as described in more detail in the '556 patent, that is configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in the '556 patent.

Because an on-demand code execution environment as implemented by a coordinator may be associated with more limited computational resources than the on-demand code execution environment described in the '556 patent (which may be implemented, for example, in a data center), the coordinator may implement a scheduler to assist in prioritization of task executions. Specifically, a scheduler receive calls to execute tasks, and enqueue such calls as work items onto a work item queue. The scheduler may then selectively dequeuer calls from the work item queue according to a scheduling algorithm. Any number of scheduling algorithms may be utilized by the scheduler, such as first in, first out scheduling, earliest deadline first scheduling, shortest remaining time scheduling, fixed priority pre-emptive scheduling, and round-robin scheduling, each of which is known in the art. Illustratively, each scheduling algorithm may be implemented based on an amount of available compute resources to a coordinator, and an amount of resources needed to complete a task call (which may be set, for example, by an author of a task or an administrator of the coordinator, or may be estimated based on static or dynamic analysis of the task). In some instances, a scheduling algorithm may also be based at least in part on a priority assigned to the task by an author of the task, by an administrator of the coordinator, by a calling entity, etc. The scheduler may process a queue of work items according to the scheduling algorithm, and when a task call is selected for dequeing, cause completion of the task call by executing the task corresponding to the call (e.g., according to the parameters of the call).

To assist in execution of a task, a coordinator can further include a resource manager to monitor a state of compute resource usage at the coordinator and to manage generation, destruction, and maintenance of execution environments in which a task will execute. The execution environments can include any portion of memory logically allocated to a task execution. Illustratively, an execution environment may correspond to a "container," operating-system-level virtualization environment, or "sand box" environment, such as a "chroot jail" or a Python virtual environment "virtualenv." In other instances, an execution environment may correspond to a virtual machine environment (e.g., a JAVA virtual machine, a virtualized hardware device with distinct operating system, etc.). In still other instances, an execution environment may be a memory space allocated to an execution of a task, without necessarily utilizing virtualization. Illustratively, a resource manager may enable a scheduler to retrieve current compute resource availability information for a coordinator, such as an amount of available memory, processor cycles (e.g., of a central processing unit, graphical processing unit, etc.), network bandwidth, or other computing resources, in order to enable the scheduler to determine which task calls to dequeuer from a work item queue. In some instances, the resource manager may provide other information to the scheduler, such as a listing of current task executions occurring at the coordinator. The resource manager may further receive and process requests from the scheduler to obtain an execution environment to which to pass a task call. Illustratively, where each task is executed in a separate execution environment, and where no execution environment exists for a given task, the resource manager may determine the resources needed for an execution of the given task (e.g., in terms of underlying compute resources, like processor capacity and memory, as well as in terms of software resources, such as drivers, runtimes, utilities, dependencies, etc.), and generate an execution environment to provide such resources. The resource manager may then return identifying information for the execution environment to the scheduler, such that the scheduler may pass a call to execute the task to the execution environment. In some instances, the resource manager may also enable re-utilization of existing execution environments. For example, some tasks, such as those corresponding to commonly-used functionalities of the coordinator, may be "pinned," such that an execution environment is pre-generated for the task. Thus, when the resource manager receives a request to generate an execution environment for the task, identifying information for the pre-generated environment may be returned, reducing the time and computing resources required to generate the execution environment. In some instances, execution environments may be re-utilized across tasks, such as when two different tasks require the same or similar resources for execution. In such instances, the resource manager may "clean" the execution environment between execution of different tasks, to ensure the security between the executions. As will be described in more detail below, the resource manager may further enable suspension and resumption of execution environments, such that execution environments of low priority tasks may be suspended to release compute resources to a high priority tasks, and resumed in accordance with a scheduling algorithm.

As discussed above, the coordinator may in some instances be configured to select whether to execute tasks locally (e.g., on the coordinator) or by use of an on-demand code execution environment within a service provider network. As a further example, both a coordinator and a service provider environment may provide a device shadow corresponding to a coordinated device, and users may submit requests to change either or both a device shadow hosted by a coordinator or a device shadow hosted within a service provider environment. In such instances, the coordinator may function to synchronize the various device shadows corresponding to a given coordinated device, as well as the coordinated device itself. For example, the coordinator and the service provider environment may implement a version vector or vector clock protocol, such that coordinator may detect an ordering of changes to the device shadow at the device shadow at the respective coordinator and service provider environment (e.g., as sequential changes in a given order, or as concurrent changes). The coordinator may then implement a (potentially configurable) rule to establish the state of a device shadow at the coordinator in response to such changes. For example, the coordinator may be configured such that sequential changes to respective device shadows at the coordinator and the service provider environment cause the device shadow of the coordinator to be updated as if the sequential changes with respect to the device shadow of the coordinator (e.g., such that if change a occurred before change b, regardless of where such change occurred, change a would be applied to the device shadow of the coordinator, and then change b would be applied). The coordinator may further be configured to resolve concurrent changes in a predetermined and potentially configurable manner. Illustratively, the coordinator may determine that, where concurrent changes occur to a device shadow of a coordinator and a device shadow of a service provider environment, both changes should be maintained so long as they are not conflicting (e.g., both changes do not seek to modify the same value maintained within a device shadow). As a further illustration, the coordinator may determine that, where conflicting changes occur to a device shadow of a coordinator and a device shadow of a service provider environment, the changes to the device shadow of the coordinator should be maintained and the changes to the device shadow of the service provider should be discarded. Various other mechanisms for addressing concurrent modifications will be recognized by one skilled in the art.

In some embodiments, a coordinator may include a communication manager, including code executable to facilitate communications between different tasks executing on the coordinator, or between a task executing on the coordinator and a task executing in a remote environment (e.g., an on-demand code execution system). Illustratively, the communication manager may provide a standardized interface through which task executions may exchange information, such as calls to execute a task or outputs of task executions. The communication manager may support a number of protocols, such that tasks may communicate with one another despite potential incompatibilities between the tasks. For example, it may generally be difficult for tasks written in different programming languages to transmit information between one another, or to interact with other code executing on a coordinator (such as a scheduler that facilitates execution of tasks). The communication manager may provide an interface to facilitate such communications via a well-known protocol, such as the hypertext transport protocol (HTTP). For example, a first task execution may transmit an HTTP request to the communication manager, indicating a desire to execute a second task. The communication manager may then validate the call, such as by authenticating the first task execution and verifying a format and content of the call, and if valid, may transmit the call to a scheduler (e.g., via an API of the scheduler) for processing on the coordinator. In some instances, the communication manager may also facilitate return of an output of the resulting execution of the second task, and may return the output to the first task execution. For example, the communication manager may assign an execution identifier to the initial HTTP request transmitted by the first task execution, and on obtaining a result of the second task execution, transmit a notification to the first task execution of the output. In other instances, the communication manager may enable a calling task to query for a state of a task execution. For example, a first task execution that calls for a second task execution may transmit a query to the communication manager for output corresponding to a given execution identifier, and the communication manager may return that output, if available. In some instances, the communication manager may additionally or alternatively return other information, such as a state of a task corresponding to an execution identifier (e.g., executing, executed successfully, resulted in error, etc.). In addition to the benefits noted above, use of a communication manager may provide for robust asynchronous intra-task communications, by handling delays in communications resulting from queuing of task executions, communications latencies, etc. Moreover, use of a communication manager may enable for use of multiple protocols according to the protocol supported by various tasks. For example, a communication manager may support both the HTTP 1.1 and HTTP 2.0 protocols, and enable tasks to communicate with one another according to different protocols. As new protocols are implemented, the communication manager may be updated to support these new protocols, while maintaining compatibility with old protocols. Thus, the communication manager can provide substantial flexibility in intra-task communications.

In some instances, the communication manager may also facilitate communications with tasks executing externally to a coordinator, such as on a remote on-demand code execution system. Generally, communications from a remote on-demand code execution system to a coordinator (or task executing on a coordinator) may be more difficult than communications from a coordinator to a remote on-demand code execution system. Illustratively, the remote on-demand code execution system may be implemented on a network that operates primarily based on communications from external sources, and be configured to support such communications (e.g., via registration with domain name service (DNS) providers, use of dedicated network connections, implementation of security policies that allow for externally-source communications, etc.). However, a coordinator may operate within a private network, where externally-sourced communications may not be as reliably. For example, a private network may not utilize a robust, reliable, and dedicated network connection, may not utilize DNS providers (or have static network addresses), and may implement restrictive security policies that inhibit externally sourced communications. To address these difficulties, a coordinator may implement a remote interface that enables communication with an external communication source, such as a remote on-demand code execution system. In one embodiment, the remote interface may be implemented as a task on the coordinator, and execute to initiate communications with the external communication source. Because such communications can be initiated by the remote interface, difficulties such as lack of static network addresses, restrictive security policies, or use of network address translation, on a private network can be at least partially mitigated. Moreover, the remote interface may provide for latency and error tolerate communications, addressing issues in reliability of a private network. Illustratively, the remote interface may periodically retrieve from a remote on-demand code execution system a set of tasks requested to be executed on a coordinator, and cause the set of tasks to be executed the coordinator (e.g., via transmitting requests to a communications manager, as described above). The remote interface may further obtain outputs of executions of the set of tasks, and return the outputs to the remote on-demand code execution environment. Thus, the remote interface can facilitate communications between the coordinator and the remote on-demand code execution environment.

As will be appreciated by one of skill in the art in light of the present disclosure, the embodiments disclosed herein improves the ability of computing systems, and particularly computing systems with limited localized user interfaces, to be coordinated and managed by an external device. Specifically, the present disclosure provides a highly configurable coordinator to coordinate and manage devices within a coordinated environment in a reliable manner, while reducing or eliminating the need for communications via external or public communication networks. Thus, the embodiments disclosed herein provide more responsive control of coordinated devices (due, for example, to reduced latency of communications), as well as increased security in coordinated devices (due, for example, to a lack of need to communicate via public networks). Thus, the present disclosure represents an improvement on existing data processing systems and computing systems in general.

Moreover, the coordinator disclosed herein may be utilized in a number of situations, and provide numerous benefits over prior systems. For example, because local communications networks (e.g., local area networks, or "LANs") in many instances provide higher bandwidth and lower latency than non-local networks (e.g., wide area networks, or "WANs"), use of a coordinator as disclosed herein may make possible or practical data processing applications that would otherwise be impossible or impractical. For example, some current network-based data analysis systems operate by gathering limited portions of data from a variety of network-connected devices, and analyzing those limited portions (e.g., according to a machine learning algorithm) to generate aggregate or predictive data regarding the network-connected devices. For example, a car manufacturer may gather limited data regarding the operation of its cars, and analyze the data to assist in development of assisted driving technologies for these cars. However, such analysis is generally based on limited data sets, as the amount of data produced by a car during operation typically exceeds the bandwidth available to transmit such data to a network-attached analysis service. By utilization of a coordinator local to such a car, analysis (e.g., application of machine learning algorithms) could be applied to a larger portion, or potentially all, of the data generated by the car. Because the output of such an analysis may be smaller than the data analyzed, such output could then be provided to a network-attached analysis service for combination or aggregation with outputs of other individual cars. Thus, the use of a coordinator may enable greater analysis of the car's data without overburdening the limited bandwidth between the car and the network-attached analysis service. A variety of other localized data processing applications are possible and within the scope of the present application. For example, multiple scenarios exist in which an always-on device can be tasked with monitoring an environment, and recording or reporting specific occurrences in such an environment (e.g., a camera may utilize motion detection to initiate recording or long-term storage of that recording). A coordinator as described herein may provide the ability to dynamically alter the occurrences in which such recording may occur, or the analysis conducted to detect such occurrences. For example, where a camera is managed by a coordinator, the camera may constantly provide a recording to the coordinator, which may analyze the recording according to a user-defined task, and take appropriate action as defined by the task, such as locally storing the recording, notifying a third party of a detected occurrence in the recording, uploading the recording to network-accessible storage. Such analysis and actions may be varied by reconfiguring the coordinator, as described herein. Thus, a coordinator of the present application can provide highly configurable, localized management and control of coordinated devices.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100, including one or more coordinated environments 110 in which a coordinator 114 may operate to control coordinated devices 112, as well client devices 102 that may interact with the coordinated environments 110 (e.g., to request a change in state of a coordinated device 112), and a service provider environment 120 that may assist in communications with or configuration of the coordinators 114 in various coordinated environments 110.

The coordinated environments 110, client devices, and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein.

While some embodiments disclosed herein may utilize known protocols, such as MQTT, accord to a standard implementation of such protocols, other embodiments may vary the implementation of such protocols. For example, standardized MQTT can utilize a "keep alive" functionality, whereby a client and broker must exchange either normal data or a specialized keep-alive message (e.g., an MQTT ping) within a threshold period of time (a "keep-alive" threshold), or the connection is assumed to be broken. However, the overhead created by specialized keep-alive messages may be undesirable within coordinated environments 112. Thus, some embodiments of the present application may implement a variable keep-alive threshold, whereby the keep-alive threshold is increased as keep-alive messages are transmitted, until an error occurs in communication. Illustratively, where a first keep-alive threshold expires, results in client transmission of a keep-alive message, and the client obtains a keep-alive response from a broker, the client may increase the keep-alive threshold for subsequent transmissions by some amount (e.g., 50%, n ms, etc.), potentially reaching a maximum amount. Where a first keep-alive threshold expires, results in client transmission of a keep-alive message, and the client does not obtain a keep-alive response from a broker, the client may descrease the keep-alive threshold for subsequent transmissions either by some amount (e.g., 50%, n ms, etc.) or to a default minimum value. Thus, as keep-alive messages are transmitted and acknowledged, the keep-alive threshold for subsequent transmissions can be increased, reducing bandwidth used to support such transmissions. These variations to the MQTT may be particularly beneficial in environments 110 with low-bandwidth or high congestion.

Each coordinated environment 110 may include a coordinator 114 and any number of coordinated devices 112, in communication via a network of the execution environment 110 (which network is not shown in FIG. 1). Because of their association within the coordinated environment 110, the coordinated devices 112 and coordinator 114 within a given environment 110 may be considered "local" to one another, in terms of communications network. For example, the coordinated devices 112 and coordinator 114 within a given environment 110 may be connected via a LAN or other localized communication network. The coordinated devices 112 and coordinator 114 may communicate with one another over such a localized communication network, in accordance with the embodiments described herein. In some instances, communications between a coordinated devices 112 and coordinator 114 may be encrypted, such as via Transport Layer Security cryptographic protocol. Illustratively, a coordinator 114 may be provisioned with a security certificate that verifies a digital identify of the coordinator. The security certificate may be signed by a public certificate authority or a private certificate authority (e.g., established by the service provider environment 120).

Each coordinated device 112 can correspond to a computing device configured to communicate with the coordinator 114 to manage functionality of the coordinated device 112. In some instances, coordinated devices 112 can correspond to fully featured computing devices, such as laptops, desktops, stand alone media players, etc., with robust localized user interface capabilities. In other instances, coordinated devices 112 can correspond to thin devices or embedded devices associated with another primary function, such as an device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 112 may include limited local user interfaces, and be configured for remote management. In some instances, coordinated devices 112 may be stateful, and operate to alter their state in response to instructions (e.g., by turning from "off" to "on," etc.).

As described in more detail below (e.g., with respect to FIG. 2), the coordinator 114 can correspond to a computing device executing instructions to coordinate, manage, or control operation of the coordinated devices 112, without requiring that instructions transmitted to the coordinated devices 112 travel outside the coordinated environments 110 (thus increase the security of such instructions and increasing the speed of their transmission). Specifically, the coordinator 114 can include a processor and memory collectively configured to manage communications between any combination of coordinated devices 112, client devices 102, and devices of the service provider network 120. The coordinator can further be configured to enable executions of tasks, in a manner similar to an on-demand code execution environment 120 of the service provider environment 120. These tasks may implement a variety of user-defined or non-user-defined functionalities, including communicating with coordinated devices 112, client devices 102, and devices of the service provider network 120. As such, the coordinator 114 can be configured to allow for manual, automatic, or semi-automatic control of coordinated devices 112. For example, the coordinator 114 may enable a client device 102 to transmit a request to change the state of a coordinated device 112, and cause such a change in state to occur. As a further example, the coordinator 114 may enable a user to specify a criterion under which a state of a coordinated device 112 should be changed, and then automatically operate to change the state of the coordinated device 112 when the criterion is satisfied.

As will be discussed below, many functions of the coordinator 114 may be established via tasks, enabling rapid alteration of these functions as desired by a user. In some instances, such tasks (or dependencies of such tasks, such as libraries, drivers, etc.) may be provided by a user of the coordinator. In other instances, such tasks may be provided to the coordinator 114 by a service provide environment 120. For example, the service provider environment 150 may maintain a library of tasks available to coordinators 114, as well as types of coordinated devices 112 to which such tasks can apply (e.g., all devices, a specific device model, devices of a specific manufacturer, type, or function, etc.). The service provider environment 150 may then provide all or some tasks to a coordinator 114 appropriate for the coordinated devices 112 in a coordinated environment 110 of the coordinator 114, or notify a user of the availability of such tasks. In one embodiment, a user may notify the service provider environment 150 or the coordinator 114 as to the coordinated devices 112 in the coordinated environment 110. In another embodiment, the coordinator 114 may be configured to determine characteristics of coordinated devices 112 within a coordinated environment 110 based on transmissions of those devices. Illustratively, on receiving a communication from a coordinated device 112 (e.g., in response to a user-initiated pairing, based on automated transmissions, etc.), a coordinator 114 may compare a content or format of the transmission to information mapping formats or contents to different device times. Such a mapping may be maintained by the service provider environment 150, and updated based on data collected from various coordinators 114. In some instances, rather than mapping transmission to device types, a coordinator 114 may function to map transmissions to tasks appropriate for a device 112, regardless of whether the type of the device 112 is known. For example, the service provider environment 150 may collect, for an established environment 110 with one or more coordinated devices 112, data identifying a content or format of transmission of such devices 112 and the tasks utilized to manage operation of such devices 112. Thereafter, newly created coordinated environments 110 may be monitored for identical or similar transmissions, and the tasks utilize in the established environment 110 may be presented for potential use in the newly create environment 110. In still other embodiments, a coordinator 114 may utilize standardized discovery protocols, such as the Universal Plug and Play (UPnP) set of protocols, to discover devices 112 within a coordinated environment 110.

Client devices 102 may include a variety of computing devices enabling a user to communicate with the coordinated environments 110, the service provider environment 120, or both. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The service provider environment 120 may provide the client devices 102 with one or more user interfaces, command-line interfaces (CLI), application programming interfaces (API), and/or other programmatic interfaces for interacting with the service provider environment 120, such as to submit a configuration for a coordinator 114, and control deployment of that configuration, to submit code corresponding to a task to be executed on the coordinator 114 or an on-demand code execution environment 150 of the service provider environment 120, to view logging or monitoring information related to coordinators 114, etc. Similarly, the coordinator 114 may provide the client devices 102 with one or more user interfaces, command-line interfaces (CLI), application programming interfaces (API), and/or other programmatic interfaces for interacting with the coordinator 114, such as to read a state of a coordinated device 112, request a change in state of a coordinated device 112, request that the coordinator 114 cause execution of a task, etc. Although one or more embodiments may be described herein as using a user interface, it should be appreciated that such embodiments may, additionally or alternatively, use any CLIs, APIs, or other programmatic interfaces.

The service provider environment 120 can include a number of elements to enable configuration of, management of, and communications with coordinators 114. Specifically, the service provider environment 120 includes a management and deployment service 130 to enable registration of coordinators 114 with the service provider environment 120 and configuration of such coordinators 114, a device shadow service 140 to enable robust changes to state of coordinators 114 and coordinated devices 112, and an on-demand code execution environment 150 providing on-demand, dynamic execution of tasks, as well as deployment and provisioning of tasks on coordinators 114.

As shown in FIG. 1, the management and deployment service 130 includes a client and data interface 132 and a configuration data store 134 that may operate collectively to enable registration of a coordinator 114 with the management and deployment service 130, generation of configurations for the coordinator 114, and transmission of configuration data to the coordinator 114. Illustratively, the client and data interface 132 may provide one or more user interfaces (e.g., APIs, CLIs, GUIs, etc.) through which a user, via a client device 102, may generate or submit a configuration of a coordinator 114 for storage in the configuration data store 134. The client and data interface 132 may further provide one or more interfaces through which a coordinator 114 may obtain the configuration, such that the coordinator 114 is reconfigured according to the obtained configuration. The configuration data store 134 can correspond to any persistent or substantially persistent data store, such as a hard drive (HDD), a solid state drive (SDD), network attached storage (NAS), a tape drive, or any combination thereof.

The device shadow service 140 can include elements enabling a "shadow state" of a device, such as a coordinator 114 or a coordinated device 112, to be created, maintained, read, altered, or deleted. As discussed above, a shadow state may correspond to data representing a desired state of a correspond device, which may or may not mirror a current state of the device. For example, with respect to a coordinator 114, a shadow state may include a desired configuration version for the coordinator 114. With respect to a coordinated device 112, a shadow state may include a desired state of the coordinated device 112 (e.g., on or off for a switch or bulb, locked or unlocked for a lock, a desired temperature for a thermostat, etc.). The device shadow service 140 may enable users, via client devices 102, or other entities to read from or modify a shadow state for a device, and may further interact with that device to synchronize the device to the shadow state. Illustratively, the device shadow service 140 may include an interface 142 (which may include, e.g., APIs, CLIs, GUIs, etc.) through which requests to read from, write to, create or delete a shadow state may be received, as well as a shadow data store 144 configured to store the shadow states. The shadow data store 134 can correspond to any persistent or substantially persistent data store, such as a hard drive (HDD), a solid state drive (SDD), network attached storage (NAS), a tape drive, or any combination thereof. Further details regarding the device shadow service 140 can be found within the '700 application, incorporated by reference above.

The on-demand code execution environment 150 can include a number of devices providing on-demand execution of tasks (e.g., portable code segments). Specifically, the on-demand code execution environment 150 can include a frontend 152, through which users, via client device 102, may submit tasks to the on-demand code execution environment 150 and call for execution of tasks on the on-demand code execution environment 150. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution system 150 can include a variety of additional components to enable execution of tasks, such as a number of execution environments (e.g., containers or virtual machines executing on physical host devices of the on-demand code execution environment 150), a worker manager to manage such execution environments, and a warming pool manager to assist in making execution environments available to the worker manager on a rapid basis (e.g., under 10 ms). Further details regarding the on-demand code execution environment can be found within the '556 patent, incorporated by reference above.

As noted above, tasks may be utilized both at the on-demand code execution environment 150 and at coordinators 114. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 150 or a coordinator 114 in a variety of manners. In one embodiment, a client device 102 or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, an network-accessible storage service, or the task data store 154) prior to the request being received by the coordinator 114 or the on-demand code execution system 150. A request interface of the coordinator 114 or the on-demand code execution system 150 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to a coordinator 114 or the on-demand code execution system 150 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the coordinator 114 or the on-demand code execution system 150 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 140 or the on-demand code execution system 150 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 114 or the on-demand code execution system 150 may inspect the call and look for the flag or the header, and if it is present, the coordinator 114 or the on-demand code execution system 150 may modify the behavior (e.g., logging facilities) of the execution environment in which the task is executed, and cause the output data to be provided back to the user. In some embodiments, the behavior/mode indicators are added to the call by the user interface provided to the user by the coordinator 114 or the on-demand code execution system 150. Other features such as source code profiling, remote debugging, etc. may also be enabled or disabled based on the indication provided in a call.

The service provider environment 120 is depicted in FIG. 1 as operating in a distributed computing environment including several computer systems that are interconnected using one or more computer networks (not shown in FIG. 1). The service provider environment 120 could also operate within a computing environment having a fewer or greater number of devices than are illustrated in FIG. 1. Thus, the depiction of the service provider environment 120 in FIG. 1 should be taken as illustrative and not limiting to the present disclosure. For example, the service provider environment 120 or various constituents thereof could implement various Web services components, hosted or "cloud" computing environments, and/or peer to peer network configurations to implement at least a portion of the processes described herein.

Further, the service provider environment 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
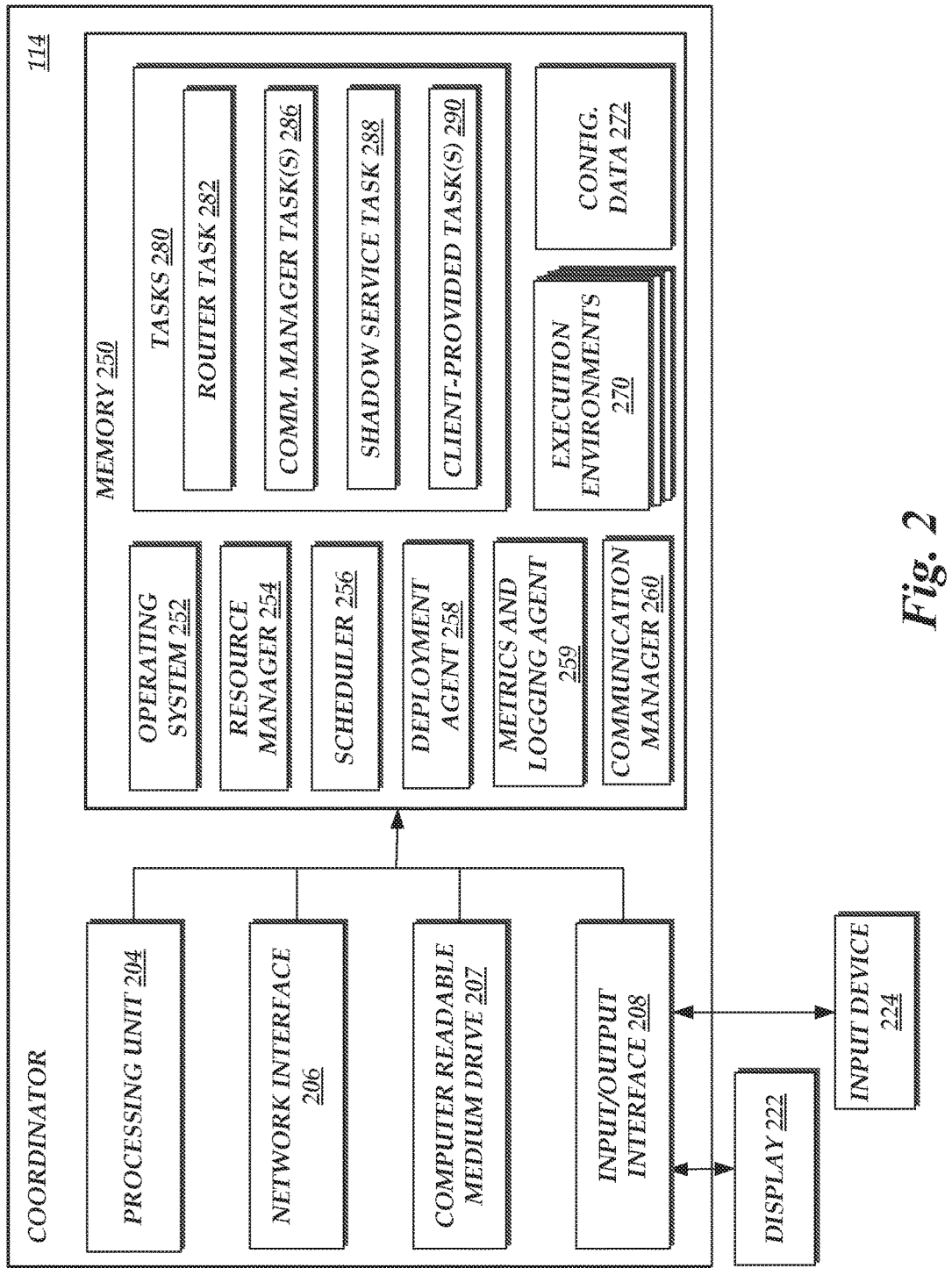
FIG. 2 depicts a general architecture of a computing device providing a coordinator of FIG. 1.

FIG. 2 depicts a general architecture of a computing system (referenced as coordinator 114) that manages coordinated devices 112 within a given coordinated environment 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The coordinator 114 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the coordinator 114 includes a processing unit 204, a network interface 206, a computer readable medium drive 207, and an input/output device interface 208, all of which may communicate with one another by way of a communication bus. The network interface 206 may provide connectivity to one or more networks or computing systems. The processing unit 204 may thus receive information and instructions from other computing systems or services via the network 104. The processing unit 204 may also communicate to and from memory 250 and further provide output information for an optional display (not shown) via the input/output device interface 208. The input/output device interface 208 may also accept input from an optional input device (not shown).

The memory 250 may contain computer program instructions (grouped as modules in some embodiments) that the processing unit 204 executes in order to implement one or more aspects of the present disclosure. The memory 250 generally includes random access memory (RAM), read only memory (ROM) and/or other persistent, auxiliary or non-transitory computer readable media. The memory 250 may store an operating system 252 that provides computer program instructions for use by the processing unit 204 in the general administration and operation of the coordinator 114. The memory 250 may further include computer program instructions and other information for implementing aspects of the present disclosure. For example, in one embodiment, the memory 250 includes a process manager 254, a scheduler 256, a deployment agent 258, and a communication manager 260.

The scheduler 256 and deployment agent 258 may be executed by the processing unit 204 to select tasks for execution by the processing unit 204, and to manage such task executions. Specifically, the scheduler 256 may include instructions to select a tasks for execution at given points in time and to suspend execution of tasks (e.g., under instances of constrained resources at the coordinator 114). The deployment agent 258 may include instructions to select an appropriate execution environment 270 in which to execute a task, to provision that execution environment 270 with appropriate access to resources needed during the task execution, and to cause execution of the task within the execution environment 270. An execution environment 270, as used herein, refers to a logical portion of memory 250 in which to execute a task. In one embodiment, execution environments 270 are programmatically separated, such that execution of code in a first execution environment 270 is prohibited from modifying memory associated with another execution environment 270. Illustratively, an execution environment 270 may correspond to a "container," operating-system-level virtualization environment, or "sand box" environment, such as a "chroot jail" or a Python virtual environment "virtualenv." In other instances, an execution environment 270 may correspond to a virtual machine environment (e.g., a JAVA virtual machine, a virtualized hardware device with distinct operating system, etc.). In still other instances, an execution environment 270 may be a memory space allocated to an execution of a task, without necessarily utilizing virtualization.

Communications between tasks executing on the coordinator, as well as between the coordinator 114 and other devices (e.g., client devices 102 and coordinated devices 112) may be facilitated by the communication manager 260. Specifically, the communication manager 260 may be configured to obtain messages directed to the coordinator 114 and forward the message to the appropriate destination. For example, the communication manager 260 may route messages between any combination of tasks, coordinated devices 112, client devices 102, and devices of the service provider execution environment 120.

To enable gathering of information regarding operation of the coordinator 114, the memory 250 further includes a metrics and logging agent 259, corresponding to code executable by the coordinator 114 to monitor operation of the coordinator 114, such as how tasks are executed at the coordinator 114, and to report information regarding such operation. The information may include, for example, execution times of tasks on the coordinator 114, as well as information regarding such executions (e.g., compute resources used, whether the execution resulted in an error, etc.). In some instances, the metrics and logging agent 259 may store this information locally, such as in the memory 250, to enable a user to obtain the information. In other instances, the metrics and logging agent 259 agent may store the information remotely, such as at the service provider environment 150. The metrics and logging agent 259 may also implement additional functionality with respect to monitoring operation of the coordinator 114, such as transmitting health check data from the coordinator 114 to the service provider environment 150.

Tasks executed by the coordinator 114 are shown as logically grouped within the tasks memory space 280, which may correspond to a logical unit of memory 250 configured to store the code corresponding to each task. As shown in FIG. 2, the tasks memory space 280 can include a number of tasks executable by the processing unit 204 to implement functionalities of the coordinator 114, including a router task 282, one or more communication manager tasks 286, a shadow service task 288, and one or more client-provided tasks 290.

The router task 282 may correspond to a portion of code executable to assist in the routing of messages within, to, and from the coordinator 114. In one embodiment, the router task 282 implements an "event flow table" to determine appropriate destinations for a message or other indications of events received at the coordinator 114. For example, the communication manager 260 may forward messages obtained at the coordinator 114 (e.g., due to generation by a task execution or reception at the input/output interface 208) to the router task 282, which may utilize the event flow table to determine that messages addressed to a certain identifier should be routed to a given task, a given client device 102, or a given coordinated device 102. In some instances, the event flow table may further be utilized to specify a manner of handling messages of a give type. For example, the event flow table may specify that messages or event data originating at a certain task or coordinated device 112 should be transmitted to another task or coordinated device 112, logged at the coordinator 114, disallowed, result in a new execution of a task, etc. The event flow table may further indicate that a message meeting specified criteria (e.g., addressed to a given identifier, including a specific flag, etc.) should be transmitted to the service provider environment 120 (e.g., to the device shadow service 140 or the on-demand code execution system 150). In one embodiment, the event flow table may utilize "topics" as identifiers, such that messages associated with a particular topic are transmitted according to a routing specified for that topic. The event flow table may further include information for how to route messages based on a source of those messages. For example, a message addressed to a given topic may be routed differently, based on whether the message is received from a first task, a second task, a first coordinated device 112, etc. By utilization of a event flow table, router task 282 can enable messages to be handled in different manners, without a change in the operation of a sender of such a message (e.g., without rewriting code for a task that generated the message, without modifying the software of a coordinated device 112 that generated the message, etc.).

The communication manager tasks 286 may enable communications between the coordinator 114 and a number of different external devices (e.g., coordinated devices 102) according to a protocol of such communications. For example, a first communication manager task 286 may be configured to manage communications using a BLUETOOTH™ protocol, a second communication manager may be configured to manage communications using an HTTP protocol, etc. In some instances, multiple communication manager tasks 286 may work collectively to implement communications. For example, a first communication manager task 286 may enable communications via the TCP protocol, while a second communication manager task 286 may enable communications via the MQTT protocol (which utilizes the TCP protocol and thus may utilize the a first communication manager task 286). Because different communication manager tasks 286 can vary the ability of the coordinator 114 to communicate via different protocols, and because the tasks of the coordinator 114 may be altered via reconfiguration of the coordinator 114, the coordinator 114 can be rapidly reconfigured to utilize a variety of different communication protocols.

The shadow service task 288 can facilitate management and interaction with device shadows maintained at the coordinator 114. Illustratively, the shadow service task 288 can implement functionality similar to that provided by the device shadow service 140 locally to the coordinator 114. Accordingly, the shadow service task 288 can maintain a shadow state (data representing a desired state) of a coordinated device 112, and allow for reading to or writing to such data. The shadow service task 288 can further enable synchronization of a coordinated device 112 with the device shadow for that device. Accordingly, by modifying a device shadow for a coordinated device 112, the state of the coordinated device 112 can be altered. By reading the device shadow for the coordinated device 112, the state of the coordinated device 112 can be determined. In some instances, the shadow service task 288 may further coordinate with another device shadow for a given device, such as a device shadow maintained by the device shadow service 140. For example, the shadow service task 288 may synchronize a local device shadow with a device shadow stored at the device shadow service 140, resolve conflicts between the local device shadow and the device shadow stored at the device shadow service 140, etc.

In addition to the tasks described above (each of which may illustratively be provided by an entity associated with the service provider environment 120), the tasks memory space 280 may include any number of client-provided tasks 290, which may correspond to executable code generated by a client device 102 and submitted to the service provider environment 120 for deployment to a coordinator 114. As such, functionalities provided by the client-provided tasks 290 may vary according to the desires of a submitting user. In some instances, the client-provided tasks 290 may be written in a coding language for which the memory 250 includes a language runtime. For example, where the coordinator 114 supports language such as node.js, Go, JAVA, and Python, the client-provided tasks 290 may include executable code written in any of those languages.

In addition, the memory 250 includes a configuration data portion 272, representing a logical portion of the memory 250 in which configuration data of the coordinator 114 is stored. The configuration data may include, for example, a current deployment version of the coordinator 114, data stored by the tasks of the task memory space 280, or other data used in the operation of the coordinator 114.

To enable configuration (and reconfiguration) of the coordinator 114, the memory 250 further includes a deployment agent 258. The deployment agent 258 can correspond to code executable to register a coordinator with the service provider environment 120, to determine a desired configuration of the coordinator 114, and in instances where a current configuration of the coordinator 114 does not match a desired configuration, to obtain configuration data for the coordinator 114 and modify the memory 250 to implement the desired configuration. Further details regarding operation of the deployment agent 258 are described below with respect to FIGS. 5 and 6.

Figure 3A:
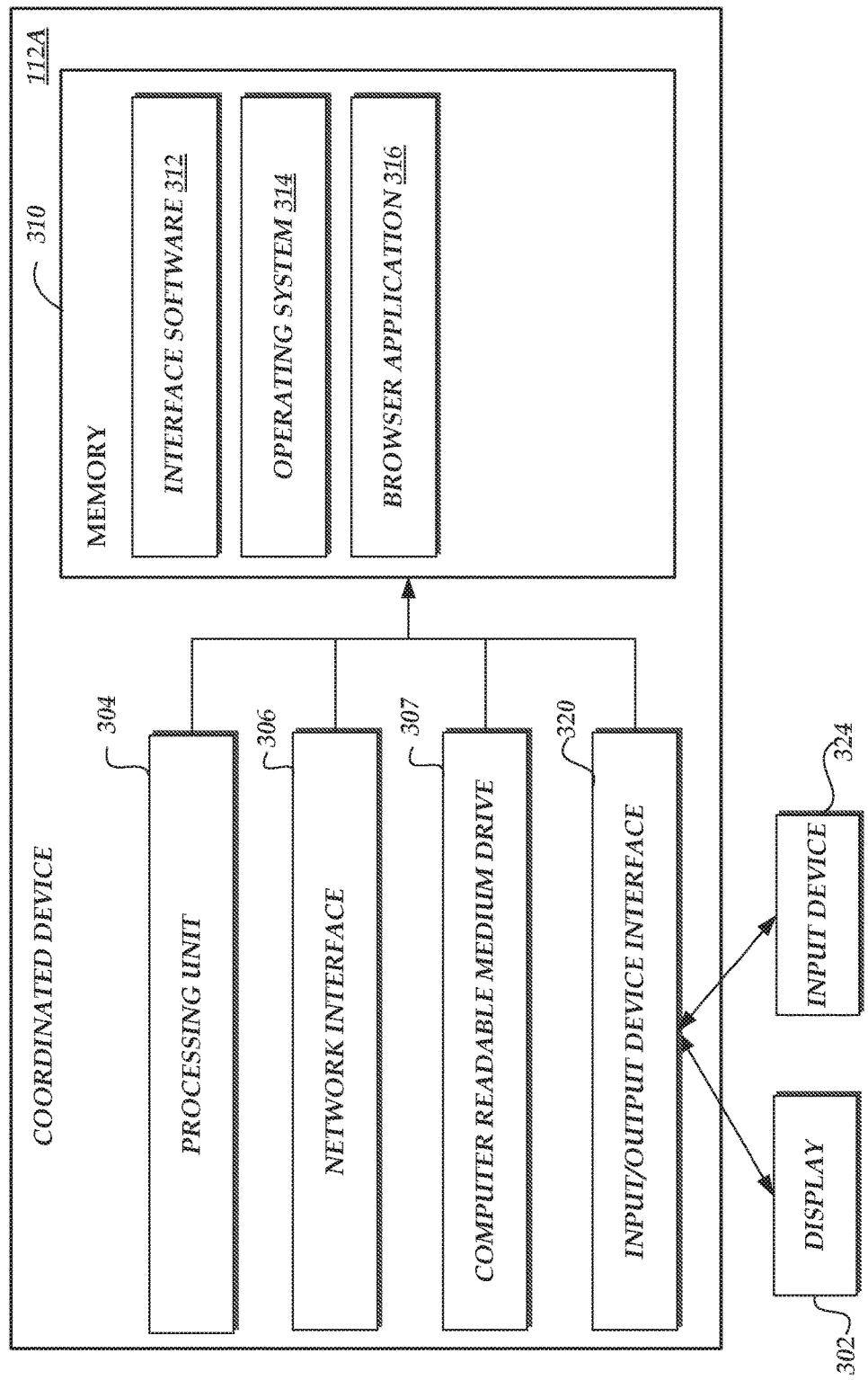

FIG. 3A depicts one embodiment of an architecture of an illustrative coordinated device 112A in accordance with the present application. The general architecture of the coordinated device 112A depicted in FIG. 3A includes an arrangement of computer hardware and software components that may be used to implement aspects of the present disclosure. As illustrated, the coordinated device 112A includes a processing unit 304, a network interface 306, a computer readable medium drive 307, an input/output device interface 320, an optional display 302, and an input device 324, all of which may communicate with one another by way of a communication bus. Illustratively, the coordinated device 112A may have more limited functionality and components, such as inputs or outputs, as embedded devices.

The network interface 306 may provide connectivity to one or more networks or computing systems, such as the network 104 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc. In some embodiments, the coordinated device 112A may include more (or fewer) components than those shown in FIG. 3A. For example, some embodiments of the coordinated device 112 may omit the display 302 and input device 324, while providing input/output capabilities through one or more alternative communication channel (e.g., via the network interface 306). Additionally, the coordinated device 112A may omit the input and output interface 320 altogether as well.

The memory 310 may include computer program instructions that the processing unit 204 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the coordinated device 112A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be a software application (or executable instructions) that provide for data connectivity.

FIG. 3B depicts one embodiment of an alternative architecture of an illustrative coordinated device 112B in accordance with the present application. The general architecture of the coordinated device 112B depicted in FIG. 3B includes an arrangement of computer hardware and software components that may be used to implement aspects of the present disclosure. However, coordinated device 112B may be associated with a reduced of components that may limit the computing functionality and operation of the coordinated device 112B. As illustrated, the coordinated device 112B includes a processing unit 350 and a network interface 352 that communicate with a communication bus. Unlike coordinated device 112BA of FIG. 3A, the coordinated device 112B may not have a computer readable medium drive, an input/output device interface, an optional display, or an input device.

The network interface 352 may provide connectivity to one or more networks or computing systems, such as the network 104 of FIG. 1. The processing unit 350 may thus receive information and instructions from other computing systems or services via a network. The memory 354 may include computer program instructions that the processing unit 350 executes in order to implement one or more embodiments. The memory 354 generally includes RAM, ROM or other persistent or non-transitory memory. In this embodiment, the memory 354 may store necessarily store a full operating system that provides computer program instructions for use by the processing unit 350 in the general administration and operation of the coordinated device 112B. Rather, in one embodiment, the memory 354 includes an interface software component 356 for accessing receiving and processing instructions.

Figure 4:
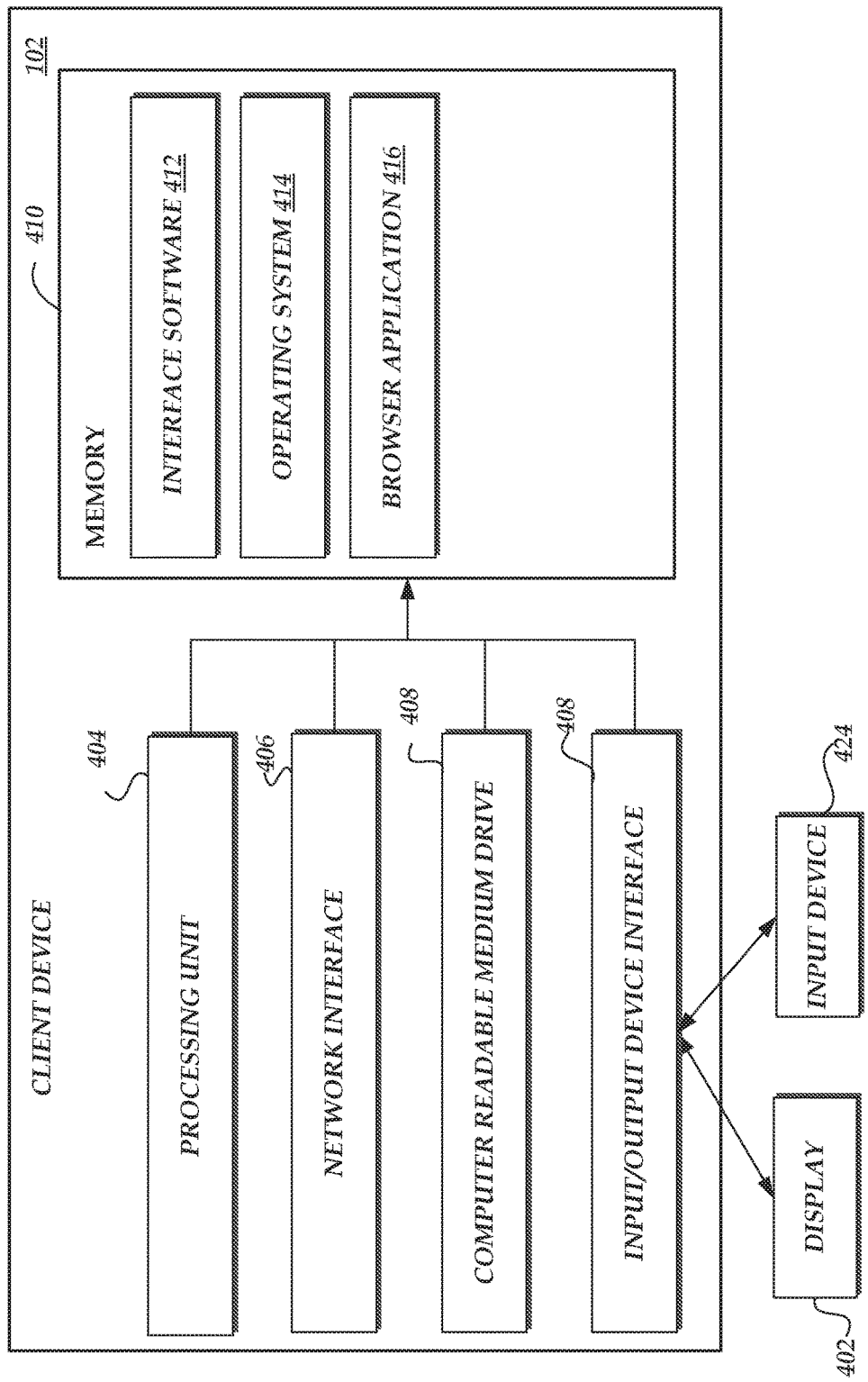
FIG. 4 depicts a general architecture of client device that may be utilized to generate and submit configuration information for a coordinator of FIG. 1.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/output device interface 420, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client device 102 may include more (or fewer) components than those shown in FIG. 4. For example, some embodiments of the coordinated device 112 may omit the display 402 and input device 424, while providing input/output capabilities through one or more alternative communication channel (e.g., via the network interface 406). Additionally, the client device 102 may omit the input and output interface 420 altogether as well.

The memory 410 may include computer program instructions that the processing unit 204 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 for accessing content. Illustratively, the browser application 416 may encompass a full software browser application, portions of a browser application or simply be a software application (or executable instructions) that provide for data connectivity.

Figure 5:
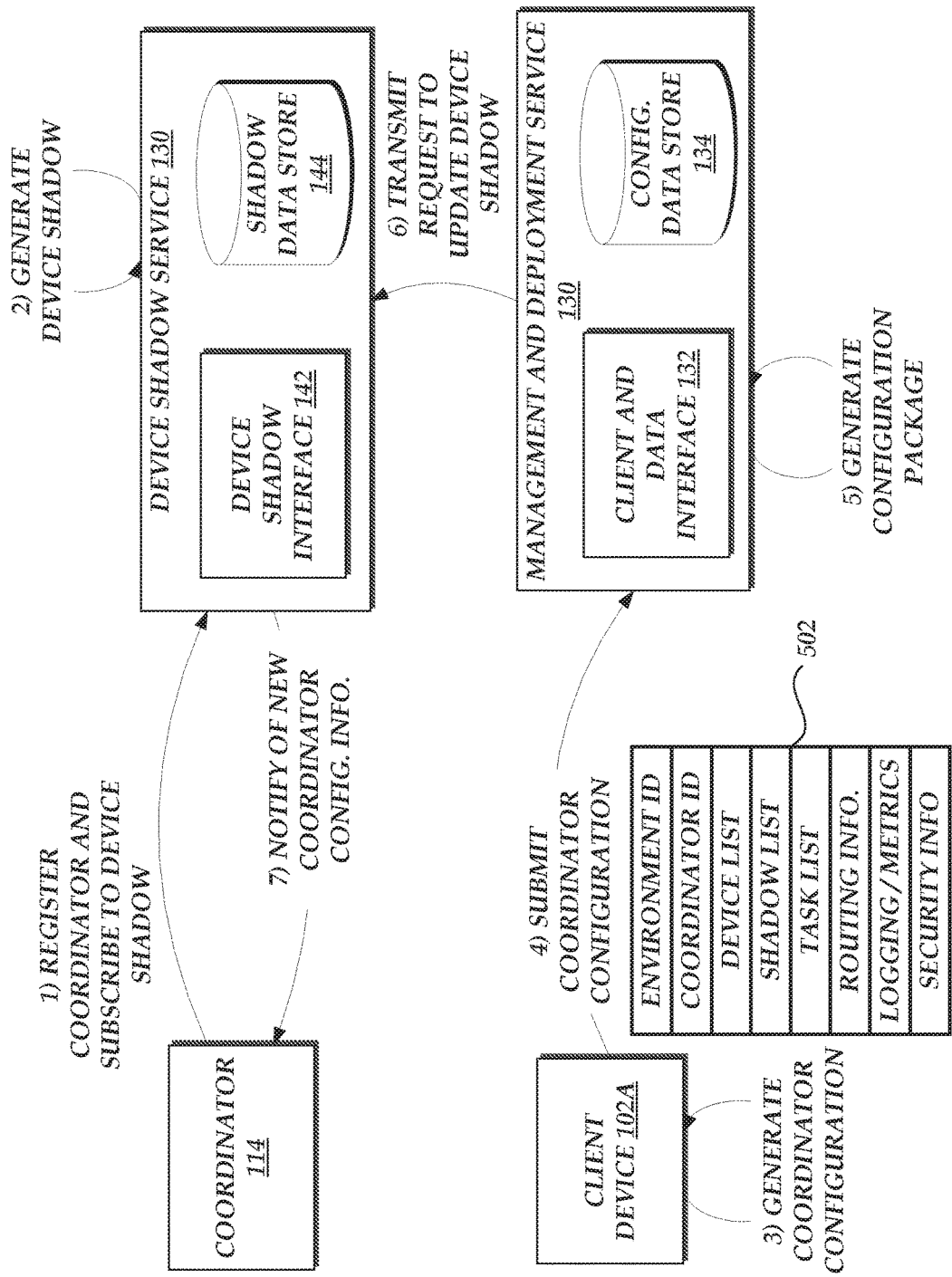
FIG. 5 is a flow diagram depicting illustrative interactions for registering a coordinator of FIG. 1 with a management and deployment service of a service provider environment, and for notifying the coordinator, via a device shadow service, of a configuration obtained from a client device.

With reference to FIG. 5, illustrative interactions are depicted for registering a coordinator 114 with the device shadow service 130 in order to enable deployment of configurations to the coordinator 114, and for submission of such a configuration via a client device 102A. The interactions of FIG. 5 begin at (1), where a coordinator submits a registration notification to the device shadow service 130, as well as a request to subscribe to a device shadow for the coordinator 114. Illustratively, interaction (1) may be implemented as part of a registration routine for the coordinator 114, whereby a user utilizes inputs of the coordinator 114 (e.g., a registration button, a screen, a keyboard/mouse, etc.) to register the coordinator 114 with an account of the user on the device shadow service 150. As will be described below, the device shadow service 150 may thereafter notify the coordinator 114 of changes to a device shadow maintained by the device shadow service 130, such that a configuration of the coordinator 114 can be modified by corresponding modification to the device shadow for the coordinator 114.

At (2), the device shadow service 130 generates a device shadow for the coordinator 114, if such a shadow does not already exist. Illustratively, the device shadow may include a configuration version for the coordinator 114, such as the current configuration version of the coordinator 114 as of the time of registration.

At (3), a client device 102A, under the control of a user also associated with the coordinator 114, generates a configuration for the coordinator 114. In some instances, the configuration may be generated entirely on the client device 102A, by use of software executing on the client device 102A (e.g., a text editor, a specialized application provided by the service provider environment 150, etc.). In other instances, the configuration may be generated via interactions between the client device 102A and the management and deployment service 130, such as via a network display page viewed on a browser application of the client device 102A.

An illustrative table of the contents of a configuration is shown in FIG. 5 as table 502. As shown in the table 502, the configuration may include an environment identifier (e.g., an identifier of a coordinated environment 110 in which the coordinator 114 is intended to operate), a coordinator identifier (e.g., an identifier of the coordinator 114, such as a serial number), a device list (a list of coordinated devices 112 to be managed by the coordinator 114, including identifying information, such as serial numbers, of the devices 112), a shadow list (a list of device shadows associated with the coordinated devices 112 of the device list), a task list (a list of tasks to be deployed to the coordinator 114), routing information (an event flow table for use by a router task of the coordinator 114), logging and metric information (a list of metrics and logging parameters for logging information regarding operation of the coordinator 114), and security information (such as security certificates to be used by the coordinator in securing communications with the service provider environment 150 or within the coordinated environment 110). In some instances, each value of the configuration may be manually specified by a user of the client device 102A. For example, a user may specify a number of client-provided tasks to be included within a coordinator 114, and a number of devices 112 to be managed by the coordinator 114. In other instances, one or more values may be automatically specified via software of the client device 102A or the management and deployment service 130. For example, the management and deployment service 130 may automatically provide the coordinator identifier or shadow list to be included within the configuration.

At (4), the configuration is submitted to the management and deployment service 130. Illustratively, submission may occur via transmission of the configuration (e.g., via upload), via submission of a network-display page, or other transmission mechanism. At (5), the management and deployment service 130 generates a configuration package for the coordinator 114, based on the submitted configuration. For example, the management and deployment service 130 may generate a data file (e.g., a ZIP file, an XML file, etc.) including the submitted configuration values for later transmission to the coordinator 114. The management and deployment service 130 may further assign a version identifier to the configuration, to distinguish the configuration from other configurations of the coordinator 114.

At (6), the management and deployment service 130 transmits a request to the device shadow service 130 to update the device shadow for the coordinator 114. For example, the management and deployment service 130 may modify a configuration version of the device shadow for the coordinator 114 to match the configuration version assigned to the configuration package generated at interaction (5).

Thereafter, at (7), the device shadow service 130 notifies the coordinator 114 of a change to the device shadow for the coordinator 114. In one embodiment, the notification may occur via the MQTT protocol, as a notification that a message has been published to a topic associated with coordinator (wherein the message may represent the updated device shadow, and the topic may correspond to the device shadow). Thus, the coordinator 114 can be informed that a new configuration package exists to be implemented at the coordinator 114.

Figure 6:
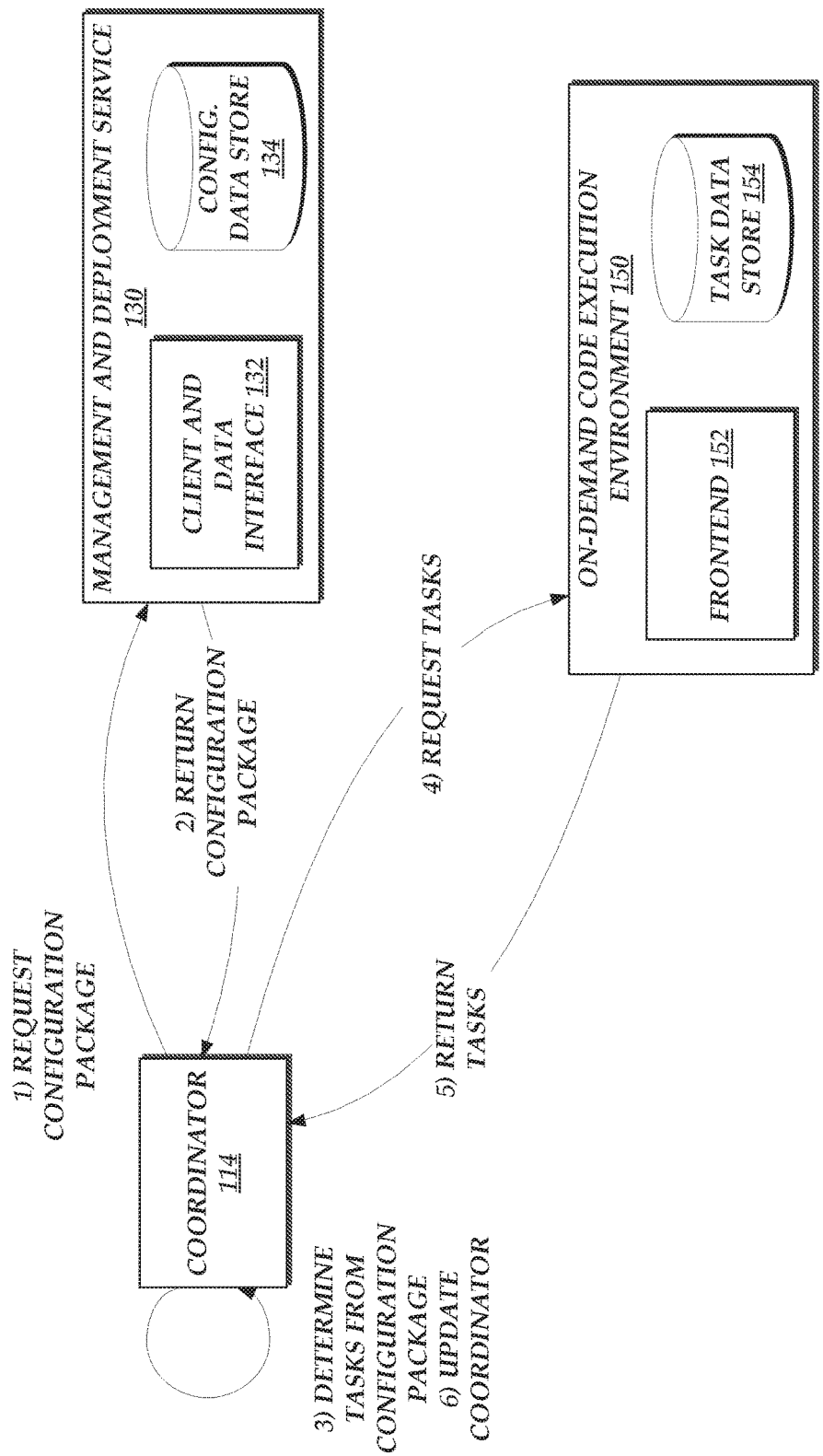
FIG. 6 is a flow diagram depicting illustrative interactions for utilizing a management and deployment service to provision a coordinator with a configuration, including a number of tasks of an on-demand code execution environment that are executable by the coordinator to implement desired functionalities.

With reference to FIG. 6, illustrative interactions will be described for retrieval and implementation of a configuration package at a coordinator 114. The interactions of FIG. 6 may occur, for example, subsequent to the interactions of FIG. 5. In one embodiment, the interactions of FIG. 6 are implemented via execution of a deployment agent 258, as described in FIG. 2. The interactions begin at (1), where the coordinator 114 requests a configuration package from the management and deployment service 130. Illustratively, the configuration package may be requested on the basis of a version identifier of the package, as indicated within a device shadow of the coordinator 114. An example of the information that may be included within a configuration package is described above with reference to FIG. 5. At (2), the configuration package is returned from the management and deployment service 130 to the coordinator 114.

At (3), the coordinator 114 inspects the configuration package to determine one or more tasks referenced within the configuration package, which tasks may implement functionalities of the coordinator 114. In addition to determining tasks, the coordinator 114 may undertake additional actions with respect to the configuration package, such as verifying the validity of the configuration package (e.g., by verifying checksum data, a digital signature, etc.).

At (4), the coordinator 114 retrieves the tasks referenced within the configuration package from the on-demand code execution environment 150. Illustratively, the coordinator 114 may utilizes identifiers of each task to request that code corresponding to the task, and any other information (such as metadata) regarding the task, be transmitted to the coordinator 114. The requested tasks may include those described above with reference to FIG. 2, and may include, for example, a router task 282, communication manager tasks 286, a shadow service task 288, and client-provided tasks 290. The requested tasks are returned to the coordinator 114 at (5). The coordinator 114 may illustratively verify the integrity and validity of the tasks on reception, such as by validating a checksum or digital signature of the tasks.

At (6), the coordinator 114 updates itself with the newly obtained configuration. Illustratively, the coordinator 114 may update a set of configuration data, such as a list of coordinated devices 112, within its memory. The coordinator 114 may further replace a current set of tasks with newly obtained tasks, as referenced in the new configuration information. In one embodiment, the coordinator 114 may perform a reboot, and the deployment agent 258 may replace references to prior tasks with the newly obtained tasks. In another embodiment, the coordinator 114 may replace tasks without performing a reboot. For example, the coordinator 114 may utilize the newly obtained tasks to satisfy newly received task calls, and halt any old tasks in times when those tasks are not used or lightly used, while replacing the old tasks as necessary with the newly obtained tasks. Thus, the coordinator can be configured with new functionality according to the newly obtained tasks.

Figure 7:
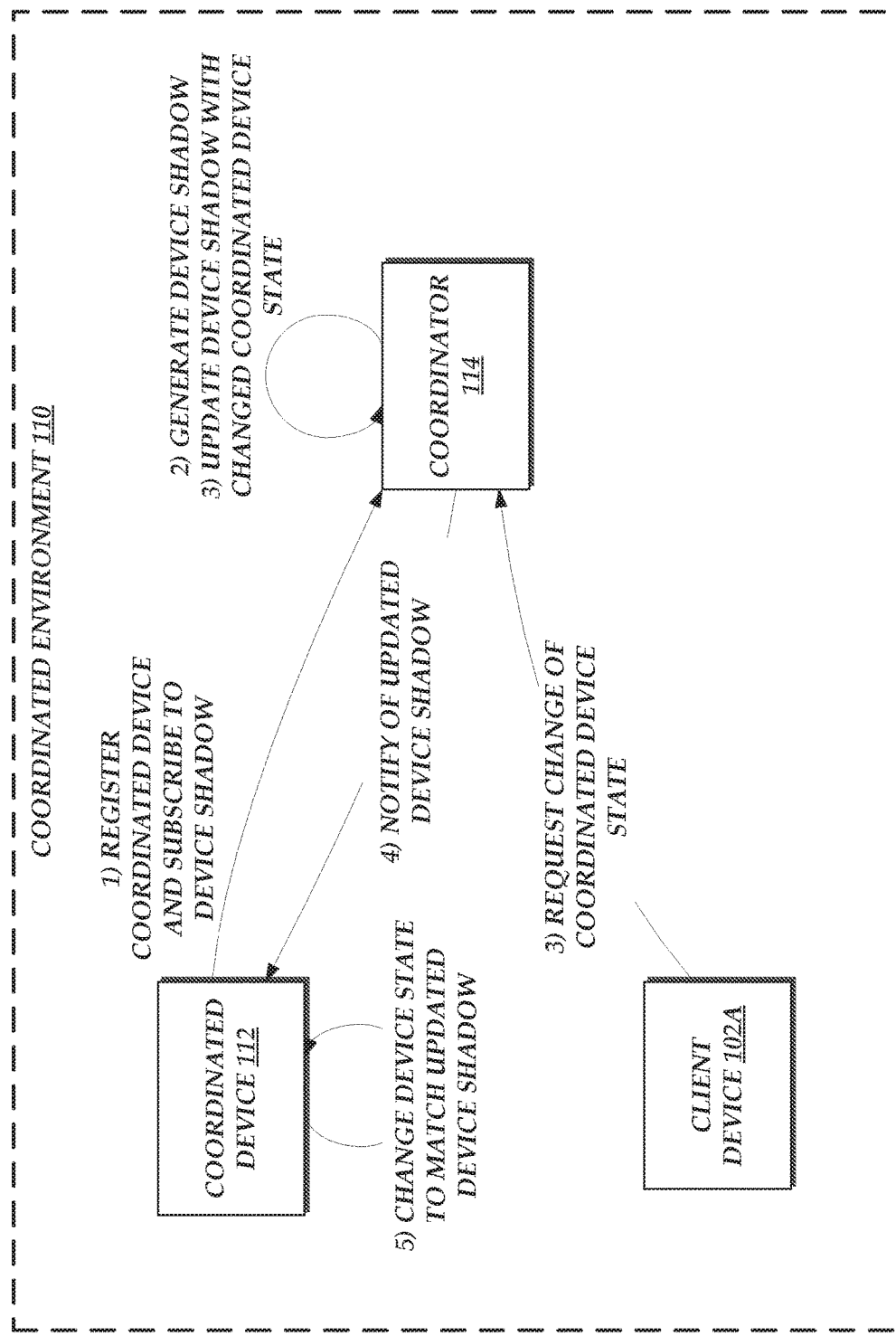
FIG. 7 is a flow diagram depicting illustrative interactions for modifying a configuration of a coordinated device via a client device via a coordinator, without requiring communications external to a coordinated environment.

With reference to FIG. 7, illustrative interactions for utilizing a coordinator 114 to modify a state of a coordinated device 112 will be described. The interactions begin at (1), where a coordinated device 112 transmits a registration to the coordinator 114, and a request to subscribe to a device shadow for the coordinated device 112. Interaction (1) may occur, for example, as part of a registration routine implemented by the coordinated device 112, as initialed by a user (e.g., via utilization of a user interface of the coordinated device 112).

At (2), the coordinator 114 generates a device shadow for the coordinated device 112, representing a desired state of the coordinated device 112. Illustratively, the device shadow may initially represent a current state of the coordinated device 112, as of the time of registration.

At (3), a client device 102A, which may be operating within the coordinated environment 110 (e.g., by virtue of connection to a LAN of the coordinated environment 110) submits a request to the coordinator 114 to modify the device shadow to match a desired device state. The request may be submitted, for example, via an application executing on the client device 102A (e.g., a browser), and transmitted to the coordinator 114 via any number of protocols supported by the coordinator 114. At (3), the coordinator 114 obtains the request, and updates a device shadow for the coordinated device 112 to match the requested change in device state.

At (4), the coordinator 114 notifies the coordinated device 112 of a change to a corresponding device shadow. Illustratively, the coordinator 114 may transmit a notification to the coordinated device 112 via the MQTT protocol that a new message (the contents of the device shadow) has been posted to a topic subscribed to by the coordinated device 112 (an identifier of the device shadow).

At (5), the coordinated device 112 updates its current state to match the updated device shadow. For example, where the coordinated device 112 is a switch or light bulb, the coordinated device 112 may turn on or off to match a desired state. Thus, by use of a device shadow, the coordinator 114 may facilitate a change to the operation of the coordinated device 112.

Figure 8:
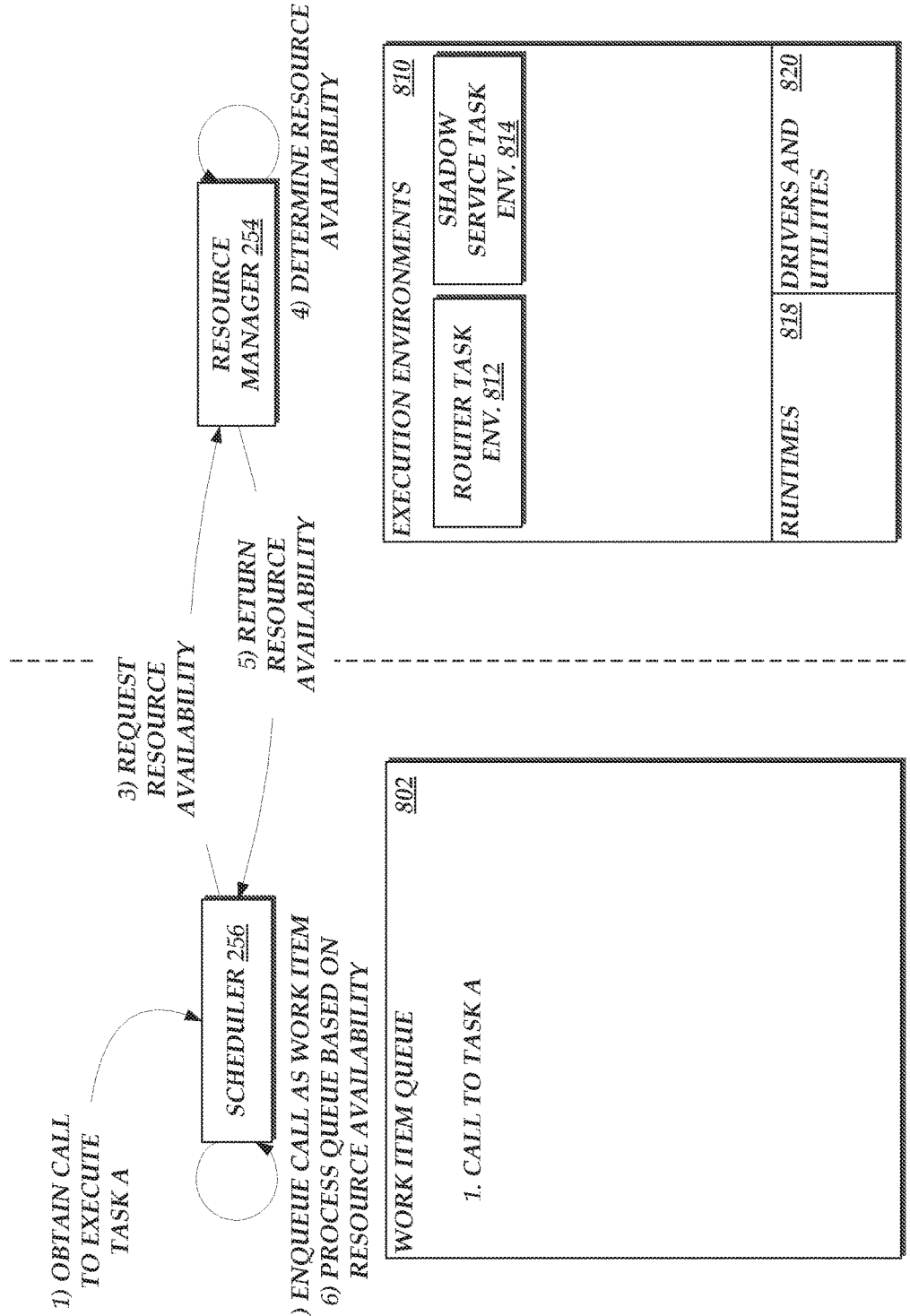
FIG. 8 is a flow diagram depicting illustrative interactions for managing a queue of work items, such as calls to execute a task, on a coordinator of FIG. 1.

With reference to FIG. 8, illustrative interactions for processing a call to execute a task on a coordinator 114 will be described. Specifically, the interactions of FIG. 8 may be undertaken by a scheduler 256 of a coordinator 114, which enqueues calls to execute tasks within a work item queue, and selects work items from the queue for processing based on a state of compute resources of the coordinator 114, as obtained from a resource manager 254.

The interactions of FIG. 8 begin at (1), where a scheduler 256 obtains a call to execute a task, designated in FIG. 8 as a "Task A." The call may include, for example, identifying information of the task (e.g., a globally unique identifier for the task), as well as parameters to which to pass the task or other information regarding execution of the task (e.g., flags specifying execution parameters for the task). In some instances, the call may be obtained directly at the scheduler 256 from another process or entity that generated the call. For example, another process or entity may invoke a function of an API provided by the scheduler for calling a task. In other instances, the call may be obtained via a communication manager, such as communication manager 260 of FIG. 2, which may function to obtain calls in a first format (e.g., HTTP) and to pass the call to the scheduler 256.

On receiving the call, the scheduler 256 enqueues the call within a work item queue, graphically depicted as work item queue 802, at (2). The work item queue 802 depicted in FIG. 8 has been simplified for illustrative purposes of description, and thus includes only the call to "Task A" described above. However, a practical implementation may include any number of work items, stemming from any number of calls to execute a task.

At (3), the scheduler 256 transmits a request to the resource manager 254 for information regarding the availability of compute resources at the coordinator 114, such as the amount of available memory, processor cycles, network bandwidth, etc., is available at the coordinator 114 (or is available for the purposes of executing tasks). The resource manager 254 may determine that information at (4), and return the requested information to the scheduler 256, at (5). In some instances, the resource manager 254 may gather the information directly, such as by querying an operating system of the coordinator for available compute resources. In other instances, the resource manager 254 may infer available compute resources based on a set of currently implemented execution environments. Illustratively, the resource manager 254 may be configured to maintain a set of execution environments, graphically depicted in FIG. 8 as execution environments 810. Each execution environment may be assigned as an environment for execution of a corresponding task. For example, the coordinator 114 may be current execution a router task within a router task environment 812 and a shadow service task within a shadow service environment 814. As with the work item queue 802, the graphical depiction of execution environments 810 has been simplified for illustrative purposes of description, and a practical implementation may include any number of execution environments associated with any number of tasks. The resource manager 254 may be configured to allocate a set amount of compute resources to the execution environments 810, and to allocate a portion of that amount of computer resources to each execution environment (which portion may in some instances vary across the execution environments). For example, the router task environment 812 may be allocated one gigabyte of RAM and 10 percent of processor cycles, while the shadow service task environment 814 may be allocated two gigabytes of RAM and 5 percent of processor cycles. The types and amounts of compute resources allocated may vary across embodiments. By subtracting the compute resources allocated to current execution environments from the total resources allocated across execution environments 810, the resource manager 254 may determine an availability of compute resources, and return that information to the scheduler 256, at (5). In some instances, the resource manager 254 may return additional information, such as a current state of execution environments 810 and whether a task is actively executing in each execution environment. As will be described below, this additional information may be utilized by the scheduler in processing the work item queue 802.

At (6), the scheduler 256 processes the work item queue 802 to determine what work items, if any, to dequeue and process. The scheduler 256 may utilize any number of scheduling algorithms in processing the work item queue 802, and may utilize a number of inputs in conducting the scheduling algorithm. For example, the scheduler 256 may utilize a priority of each work item in the work item queue 802 and a priority of the currently executing tasks, associated with execution environments 810. These priorities may be established, for example, by a caller to a task, an author of the task, or an administrator of the coordinator 114. As a further example, the scheduler 256 may utilize an availability of compute resources to determine what work items to dequeue, as well as an estimated usage of compute resources to process a queued work item (e.g., an estimated usage of compute resources to dequeue the item, allocate an execution environment to a task called via the work item, and execute the task within the execution environment). The estimated usage of compute resources to process a queued work item may be established, for example, by a caller to a task, an author of the task, or an administrator of the coordinator 114. In some instances, the estimated usage of compute resources to process a queued work item may be established automatically, such as via static or dynamic analysis of code corresponding to the work item, a review of historical compute resource usage to dequeue the same or similar work items, etc. In some instances, the scheduler 256 may utilize additional inputs, such as whether a task corresponding to a work item is currently executing on the coordinator. For example, the scheduler 256 may be configured to allow only a set number (e.g., one) of concurrent executions of a given task, and may therefore decline to process work items corresponding to a task if an execution of the task is currently active within the execution environments 810. Thus, by implementation of a scheduling algorithm, the scheduler 256 may obtain calls to execute tasks and utilize information regarding a state of the coordinator 114 to select an order and timing in which to process such calls. The scheduler 256 can therefore enable orderly processing of calls to execute tasks, even when the number of calls received would otherwise overwhelm the compute resources of the coordinator 114.

The interactions of FIG. 8 are described with reference to a single resource manager 254 associated with execution environment 810 of a coordinator 114. In some embodiments, the scheduler 256 may interact with multiple resource managers 254 to determine an availability of compute resources from which to process calls on the work item queue 802, or a single resource manager 254 may operate to monitor resource availability between multiple devices (e.g., a coordinator 114 and one or more coordinated devices 112). Illustratively, one or more coordinated devices 112 may be configured to execute tasks, and may provide resource managers 254 (or utilize a remote resource manager 254, such as that provided by a coordinator 114) to monitor an availability of compute resources on the coordinated device 112 and report that availability to the scheduler 256. The scheduler 256 may then determine whether execution of a task on a coordinated device 112 would be appropriate. In some instances, the scheduler 256 may be configured to select between multiple potential locations for an execution environment in which to execute a task (e.g., on the coordinator 114 or one a coordinated device 112). Illustratively, the coordinator 114 may utilize a modified scheduling algorithm to distribute tasks for execution on multiple devices, which may vary, for example, based on the ability of a device to execute the task (e.g., according to the hardware of the device, the availability of compute resources, etc.). In some instances, multiple coordinators 114 (either in the same coordinated environment 110 or across difference environments 110) may operate collectively to execute tasks, according to a distributed computing algorithm. For example, schedulers 256 across multiple coordinators 114 may communicate the discover devices with excess compute capacity, and to distribute queued work items to such devices. Accordingly, the illustrative example of FIG. 8 (including a single scheduler 256 and resource manager 254) is intended to be illustrative in nature.

Figure 9:
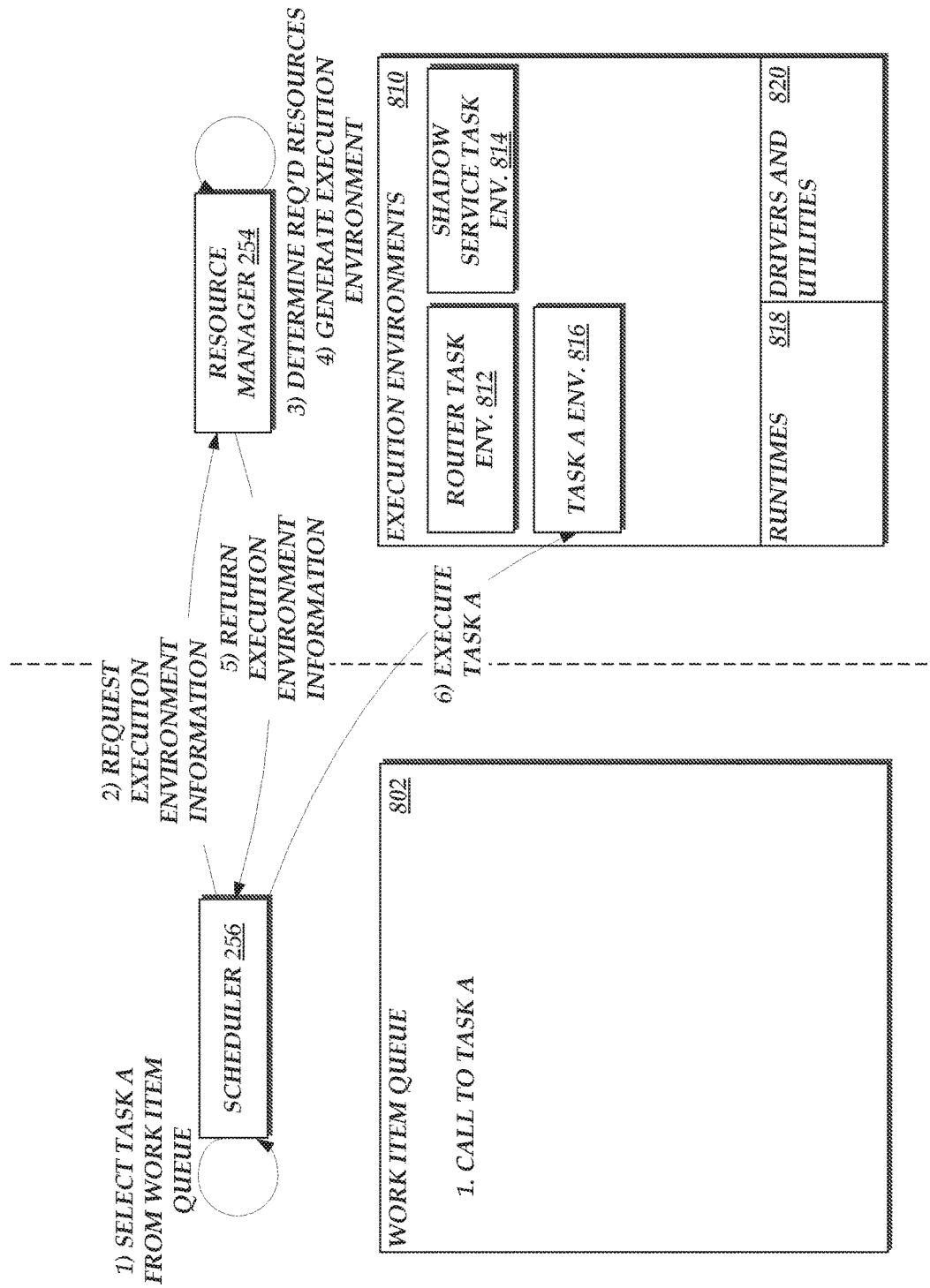
FIG. 9 is a flow diagram depicting illustrative interactions for processing a task call from a queue of FIG. 8 by generating an execution environment in which to execute a call to a task and executing the task within the execution environment.

With reference to FIG. 9, illustrative interactions for selecting a work item from a work item queue and executing a task corresponding to the work item will be described. The interactions of FIG. 9 may take place, for example, subsequent to the interactions of FIG. 8. These interactions begin at (1), where the scheduler 256 selects a work item from the work item queue 802 for processing. Interaction (1) may occur, for example, according to a scheduling algorithm implemented by the scheduler 256, as discussed above with respect to FIG. 9. For the purposes of illustration with respect to FIG. 9, it will be assumed that the scheduler 256 has selected a call to "Task A" from the work item queue 802 for processing. It will further be assumed that sufficient compute resources exist at the coordinator 114 to process a call to Task A.

At (2), the scheduler 256 transmits a request to the resource manager 254 to generate an execution environment associated with Task A. For the purposes of description of FIG. 9, it will be assumed that no current execution environment exists associated with Task A. Thus, the resource manager 254, at (3), determines a set of resources required for an execution environment associated with Task A. The resources may include, for example, a portion of compute resources, such as processor availability and memory. The resources may further include data resources, such as runtime 818 or drivers and utilities 820 required to execute Task A. Illustratively, where Task A corresponds to code written in a given programming language (e.g., Python, GO, Java, Javascript, etc.), the resources manager 254 may determine that execution of Task A requires access to a runtime corresponding to that programming language. Where Task A corresponds to code to interact with or manage a physical peripheral to the coordinator 114 (such as a specialized input/output device), the resource manager 254 may determine that execution of Task A requires access to a library, driver, or utility associated with that physical peripheral. In one embodiment, runtimes, drivers, utilities, or other dependencies may be stored within data for a task itself (e.g., within an data image of a container for the task). Thus, provisioning of an execution environment 810 with the data of a task may be sufficient to provide the task with all required dependencies. However, such inclusion of dependencies within the data for an individual task may be inefficient where multiple tasks share dependencies (e.g., where multiple tasks utilize the same driver, library, runtime, etc.). This may be especially problematic when the coordinator 114 has limited data storage comparative to the number of tasks desired to be executed on the coordinator 114. Accordingly, in some embodiments, the runtimes 818 and drivers and utilities 820 on a coordinator 114 may be stored in memory of the coordinator that is distinct from the execution environments 810. To enable access to the runtimes 818 and drivers and utilities 820 (or other dependencies), the resource manager 254 may provide an execution environment for a given task with access to those runtimes 818 and drivers and utilities 820 (or other dependencies), as separately stored. To maintain security between different execution environments, such access outside of the execution environment may be limited (e.g., read-only). For example, where the resource manager 254 utilizes a container as an execution environment, the container may be provided with a read-only mount point or a access-restricted symbolic link to a location of a required dependency on the coordinators 114. Multiple execution environments may thus share access to a given dependency, and the total data storage usage of a coordinator 114 can be reduced relative to separate and duplicative storage of dependencies.

In some instances, multiple execution environments may be enabled to share read-only access to a given dependency, while maintaining an ability to make localized modifications to that dependency. For example, a coordinator 114 may in some instances utilize union mounting (or a union filesystem) to provide read-only access to a common memory space (e.g., an underlying file system of the coordinator 114) and read/write access to a localized memory space (e.g., a portion of an execution environment or other storage space associated with a task), and to present a combined view (a "union mount") of the common memory space and localized memory to an execution environment. Specifically, the localized memory space may be utilized as an "upper" filesystem and the common memory space may be utilized as a "lower" filesystem. As such, writes to the union mount may occur with respect to the "upper" localized memory space, and reads from the union mount occur from the "upper" localized memory space if the requested file exists in such memory space, or from the "lower" common memory space if the requested file does not exist in the localized memory space. The union mount may provide an apparent ability to delete data in the "lower" common memory space by writing whiteout data to the "upper" localized memory space, such that attempts to access the data from the union mount fail, but the underlying data on the common memory space is not effective. In this manner, multiple execution environments can be enabled to access a common set of data (e.g., dependencies), while maintaining an apparent ability to modify and delete that common set of data on a localized basis. In some instances, union mounts may be utilized to provide an apparent ability to write to all or substantially all storage space of a coordinator 114. For example, a union mount may utilize the root directory as the lower common memory space. In other instances, union mounts may be utilize to provide an apparent ability to write to less than all storage space of a coordinator 114, such as an apparent ability to write to a subdirectory, or to all non-hidden files in a root directory. Thus, the data that is provided to an execution environment may be modified in accordance with the requirements of that environment.

After determining the required dependencies for a task (in the example of FIG. 9, Task A), the resource manager 254, at (4), generates an execution environment for the task. As noted above, such an execution environment a "container," operating-system-level virtualization environment, or "sand box" environment, such as a "chroot jail" or a Python virtual environment "virtualenv." As noted above, the resource manager 254 may provision the execution environment with any data resources required to execute the task, including code corresponding to the task itself (e.g., as retrieved from data storage of the coordinator 114 or external data storage), any runtimes 818 required by the task, and any drivers and utilities 820 required by the task. The generated execution environment is depicted in FIG. 9 as Task A environment 816. Thereafter, at (5), the resource manager 254 can notify the scheduler 256 that an execution environment has been created, and identify the execution environment (that is, Task A environment 816) to the scheduler 256.

The scheduler 256, in turn, can utilize the identifying information for the execution environment to call for execution of the task within the environment. Accordingly, in the interactions of FIG. 9, the scheduler 256 can transmit a call to the Task A environment 816 to execute the task according to the parameters included within the initial call to the task (e.g., prior to the call being enqueued at the work item queue 802). Thus, Task A can be executed at the coordinator 114 within an execution environment 816, in order to carry out the functionality of the code corresponding to that task.

As noted above, in some embodiments, a scheduler 256 may communicate with multiple resource managers 254 across different devices to process work items of the queue 802, or a single resource manager 254 may be configured to manage execution environments 810 in multiple devices. Accordingly, the interactions of FIG. 9 may in some embodiments be modified to address such configurations. For example, where the scheduler 256 interacts with multiple resource managers 254, the scheduler may be configured to select an appropriate resource manager 254 from which to request an execution environment (e.g., according to a scheduling algorithm, as described above), and thereafter to interact with the appropriate resource manager 254 to obtain execution environment information. As another example, where a scheduler 254 interacts with a resource manager 254 that manages execution environments 810 in multiple devices, the resource manager 254 may be configured to generate an execution environment on an appropriate device (e.g., one selected according to the requirements of the task and the resources provided by the device), and return information identifying the execution environment. Accordingly, the interactions of FIG. 9 may vary according to the configuration of a coordinated environment 110.

Figure 10:
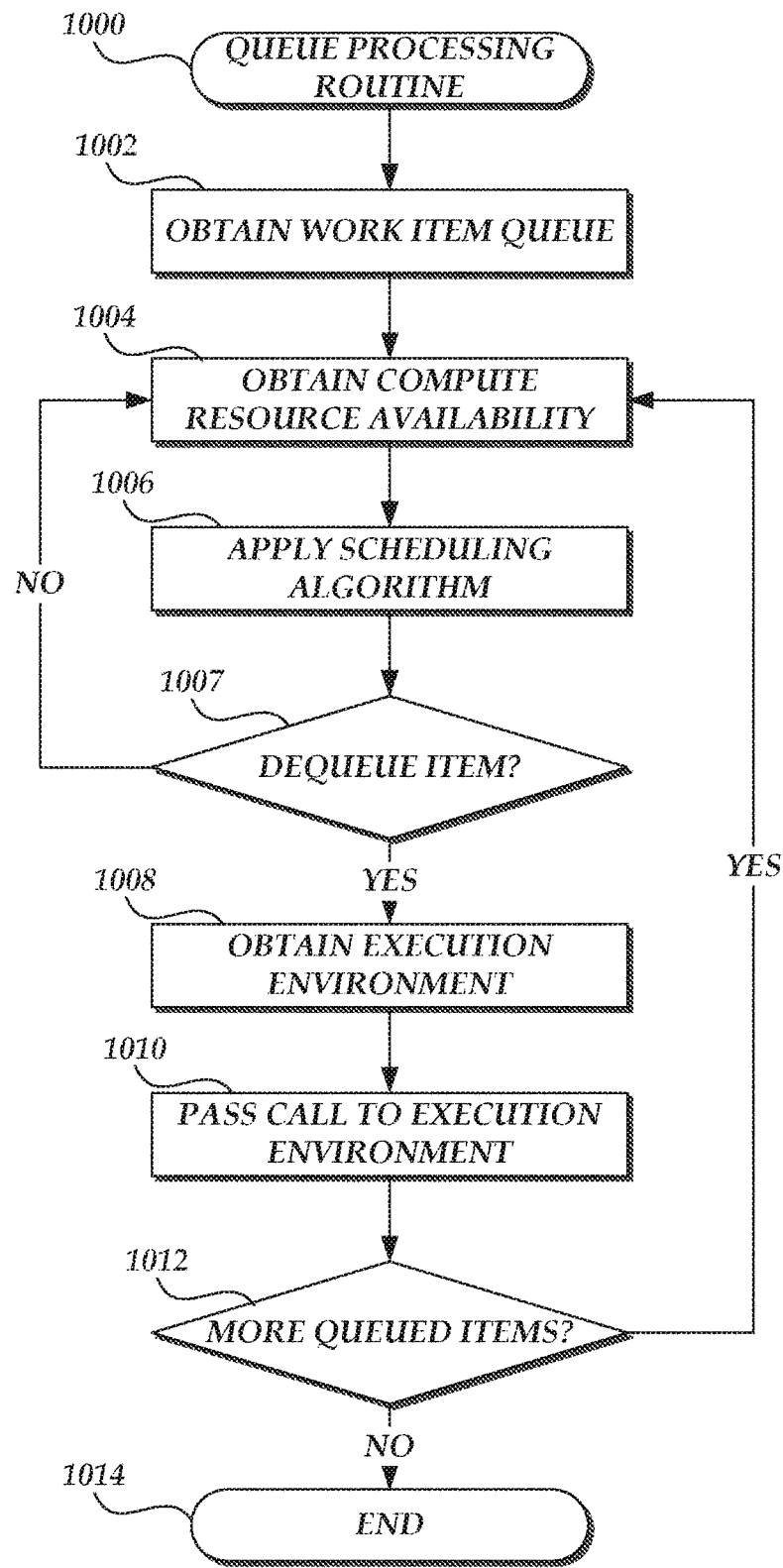
FIG. 10 depicts an illustrative queue processing routine that may be implemented by a coordinator of FIG. 1.

With reference to FIG. 10, an illustrative routine 1000 will be described for processing a queue of work items, such as calls to execute tasks on an on-demand code execution system. The routine 1000 may be implemented, for example, by a scheduler 256 executing on a coordinator 114, as shown in FIG. 2.

The routine 1000 begins at block 1002, where the scheduler 256 obtains a queue of work items. Each work item may correspond, for example, to a call to execute a given task on the coordinator 114 (e.g., according to parameters designated in the call). Illustratively, the work item queue may be maintained and managed by the scheduler 256, such that other tasks or software executing on the coordinator 114 may pass task calls to the coordinator to enqueue the task call as a work item on the work item queue.

At block 1004, the scheduler 256 obtains compute availability for the coordinator 114. Compute availability may include any metric regarding the availability of a compute resource (processors, memory, bandwidth, etc.). In one embodiment, the compute availability is received directly from an operating system of the coordinator 114. In another embodiment, the compute availability is received from an application executing on the coordinator 114, such as a resource manager. Implementation of block 1004 may also include obtaining other information regarding a state of the coordinator 114, such as the state of execution environments on the coordinator 114, a set of tasks executing in those execution environments, etc.

At block 1006, the scheduler 256 applies a scheduling algorithm to the work item queue according to the determine compute resource availability (and potentially other inputs, such as the set of tasks executing in execution environments) to determine one or more work items to dequeuer and process. As discussed above, any number of scheduling algorithms may be used by the scheduler 256 in processing the queue, such as first in, first out scheduling, earliest deadline first scheduling, shortest remaining time scheduling, fixed priority pre-emptive scheduling, and round-robin scheduling, etc. In some instances, a scheduling algorithm may also be based at least in part on a priority assigned to the task by an author of the task, by an administrator of the coordinator, by a calling entity, etc.

Implementation of the routine 1000 varies at block 1007 according to whether the scheduler 256 determines, according to an implemented scheduling algorithm, whether to dequeuer a work item from the work item queue, and execute a task corresponding to the work item. If the scheduler 256 determines that no work item should be dequeued (e.g., because insufficient compute resources exist to execute a task called by the work item, and a priority of the work item does not warrant halting of any currently executing task in order to create more available compute resources), the routine 1000 returns to block 1004, as described above.

If the scheduler 256 determines that a work item should be dequeued, for example because sufficient compute resources exist to execute a task called by the work item or a priority of the work item warrants making such resources available (e.g., by pausing a currently executing process), the routine 1000 continues to block 1008, where the scheduler 256 obtains identifying information of an execution environment in which to execute the task called by the work item. Illustratively, the scheduler 256 may obtain such identifying information by issuing a request to a resource manager, which may identify (and potentially generate) an execution environment allocated to execution of a given task, and return identifying information of the execution environment to the scheduler 256. One illustrative routine that may be implemented by a resource manager to identify and potentially generate an execution environment will be described with reference to FIG. 11, below.

At block 1010, the scheduler 256 passes the call to execute the task corresponding to the dequeued work item to the execution environment identified at block 1008. Illustratively, execution environment may (by virtue of actions of a resource manager, for example) be provisioned with code corresponding to the called task, as well as any dependencies of such code. Thus, the scheduler 256 may make a call to the execution environment to execute the code, and pass the code any parameters associated with the dequeued work item. Thus, the scheduler 256 may cause the work item to be processed from the queue.

The routine 100 then continues to block 1012, where implementation may vary according to a state of the work item queue. For example, where more work items exist within the queue, the routine 1000 may return to block 1004, as described above. Where no more work items exist within the queue, the routine 1000 may end at block 1014.

While one possible implementation of the routine 1000 is described for illustrative purposes, one skilled in the art will appreciate that variations on this routine 1000 are possible. For example, in some instances the routine 1000 may be implemented as a continuous loop, such that it executes so long as the scheduler 256 is operating. As another example, various portions of the routine may be run in whole or in part in parallel, or as multiple distinct routines. Illustratively, a first routine may operate to continuously obtain resource availability, while a second routine applies a currently-known resource availability to the work item queue via a scheduling algorithm, and a third routine implements dequeuing and processing of dequeued work items (e.g., obtaining an execution environment and passing a call to such an environment). Thus, the blocks of routine 1000 are intended to be illustrative in nature.

Figure 11:
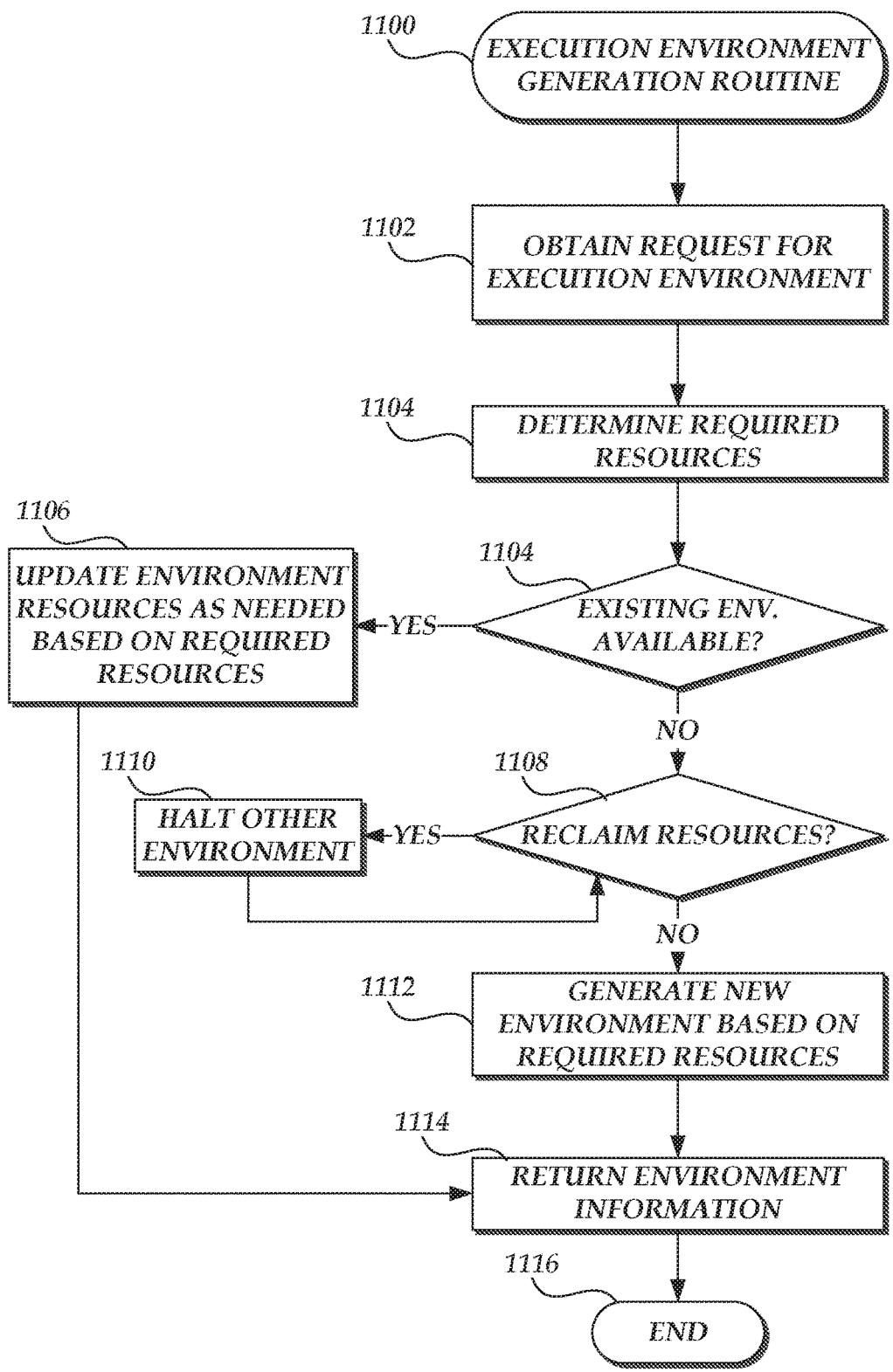
FIG. 11 depicts an illustrative execution environment generation routine that may be implemented by a coordinator of FIG. 1.

With reference to FIG. 11, one illustrative routine 1100 will be described for identifying and potentially creating an execution environment in which to execute a task. The routine 1100 may be carried out, for example, by a resource manager 254 executed by a coordinator 114.

The routine 1100 begins at block 1102, where the resource manager 254 obtains a request for an execution environment in which to execute a task. The request may be obtained, for example, from a scheduler in accordance with processing of a work item queue, such as is described above with reference to FIG. 10.

At block 1104, the resource manager 254 determines a set of resources to be provisioned to the execution environment. The resources may include, for example, compute resources (e.g., processor usage, memory, bandwidth, etc.), as well as data resources, such as runtimes, drivers, libraries, or other dependencies. The set of resources may be determined, for example, based on information regarding the task intended to execute in the execution environment. For example, the resource manager 254 may determine a set of resources required for execution of the task (e.g., as defined by an author of the task, an administrator of a coordinator, parameters of a call to execute the task, etc.), and identify that set of resources as the resources required for the execution environment.

At block 1104, the resource manager 254 determines whether an existing execution environment is available for utilization. In one embodiment, the resource manager 254 may utilize an existing execution environment for an execution of the task only when the environment has previously been assigned to execution of that task. In another embodiment, the resource manager 254 may utilize an existing execution environment when the environment has previously been assigned to execution of a similar task (e.g., within a same category of tasks, such as security category), or when the environment has previously been provisioned with resources also required to be determined in block 1104.

If an existing environment is available, the routine 1100 proceeds to block 1106, where the resource manager 254 updates the existing execution environment as necessary to prepare the environment for a new task execution. Illustratively, where the resources required at block 1104 do not match the resources currently provisioned to an execution environment, the resource manager 254 may provision the environment with the additionally required resources (and potentially remove access to non-required resources, such as unused drivers, utilities, libraries, etc.). The resource manager 254 may further refresh or "clean" the execution environment, to ensure that changes to the execution environment during a prior task execution to not effect subsequent executions. For example, the resource manager 254 may clear environmental variables within the execution environment, or clean data caches or temporary file directories associated with the execution environment. Thereafter, the routine 1100 proceeds to block 1114, where identifying information of the execution environment 114 (e.g., a name, locator, etc.) is returned in response to the request, such as to a scheduler. The routine 1100 then ends at block 1116.

Returning to block 1104, if an existing execution environment is not available, the routine 1100 proceeds to block 1108, where the resource manager 254 determines whether a reclamation of resources is required in order to generate a new execution environment. Illustratively, where the required computer resources determined at block 1104 exceed the available compute resources of a coordinator, the resource manager 254 may determine that compute resources should be reclaimed by halting or pausing an existing execution environment. In such an instance, the routine 1100 proceeds to block 1110, where the resource manager 254 halts another active execution environment. For example, the resource manager 254 may pass a call or interrupt to a thread executing in the other active execution environment, indicating that the execution environment will be paused. Such a call or interrupt may cause the thread to save its state, such that the thread can be resumed at a later point in time (e.g., when compute resource availability increases). In other instances, the resource manager 254 may operate to save a state of the other execution environment. In one embodiment, the state of the other execution environment may be saved to a memory of a coordinator, such as by taking a snapshot image of the execution environment. In another embodiment, the state of the other execution environment may be saved via a device shadow. Illustratively, a task executing in the other execution environment may be considered a "device" by the coordinator, and be associated with a device shadow. A state of the other execution environment, such as the current value of variables within the environment and a location of execution, may be saved to the device shadow. Thus, a task executing in the other execution environment may be resumed by referencing the device shadow and saved values. The use of device shadows is described in more detail in the '700 application, incorporated by reference above.

By halting another execution environment, the resource manager 254 may reclaim compute resources for use by a newly generated execution environment. The routine 1110 then returns to block 1008, where it is determined whether additional resources should be reclaimed. The routine 1100 may then continue to loop between blocks 1108 and 1110 until no additional resources should be reclaimed (e.g., until sufficient resources exist to allocate to a new execution environment). The routine 1100 then proceeds to block 1112.

At block 1112, the resource manager 254 generates a new execution environment based on the required resources, as determined at block 1104. As noted above, execution environments can include any logical portion of memory allocated to execution of a task, such as a "container," operating-system-level virtualization environment, or "sand box" environment, such as a "chroot jail" or a Python virtual environment "virtualenv." Thus, at block 1104 the resource manager 254 may generate such an execution environment by designating a portion of memory to execution of a task, and allocating that portion of memory with the required resources. Illustratively, the resource manager 254 may provision the execution environment with required data resources, such as by copying data resources into the execution environment or modifying the execution environment such that it is provided access to data resources outside of the execution environment (e.g., by placing a read-only mount point within the execution environment pointing to an external data resource).

Thereafter, the routine 1110 proceeds to block 1114, where the resource manager 254 returns identifying information of the resource environment to a requesting entity, such as the scheduler. The routine 1110 then ends at block 1116.

Figure 12:
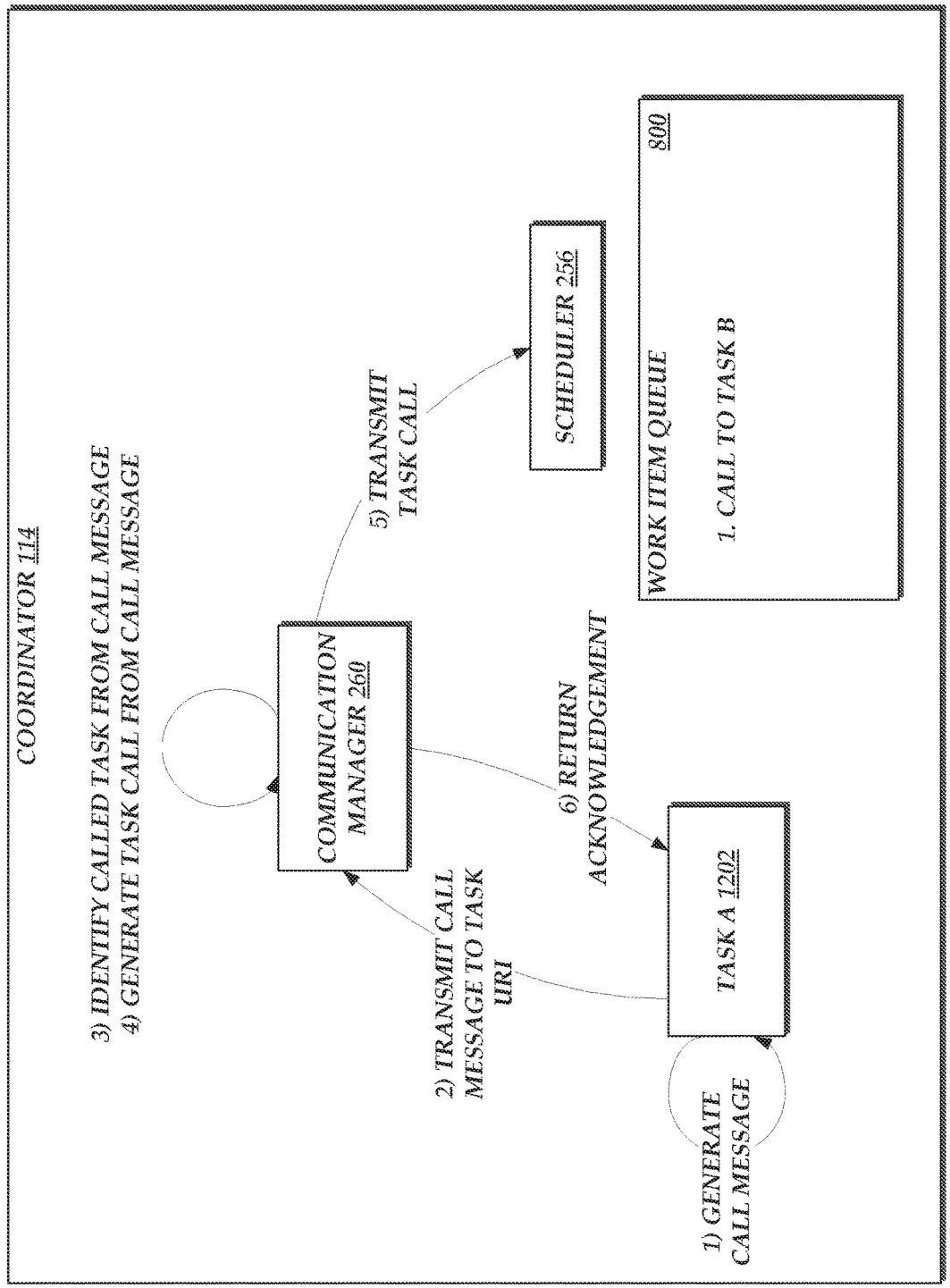
FIG. 12 is a flow diagram depicting illustrative interactions for use of a communication manager to enable a first task execution to call for a second task execution on a coordinator of FIG. 1.

With reference to FIG. 12, a set of illustrative interactions will be described for utilization of a communication manager 260 to enable a first task execution on a coordinator 114 to call for a second task execution. The interactions may occur, for example, to enable an execution first task to detect a state of a coordinated environment 110 satisfies a given condition, and to call for execution of a second task to take an action in response to that condition (e.g., to transmit a message to a coordinated device 112, such as a light, to change state in response to detecting a time of day, departure of tenants, etc.). As noted above, use of a communication manager 260 to facilitate these intra-task communications can be beneficial in providing for robust handling of asynchronous communications and to enable the use of various and different protocols within an inter-task communication or call to execute a task.

The interactions begin at (1), where a first task, denoted as Task A 1202 in FIG. 12, generates a call message, calling for execution of a task on a coordinator 114. The call message may be in any format supported by the communication manager, and may specify, for example, parameters to be passed to a task execution or metadata regarding a requested execution (such as a priority to assign to the execution). In one embodiment, the call message is a HTTP request message. In some instances, the call message may specify a task to be called, such as via a unique identifier for the task. In other instances, the task to be called may be specified by use of a destination for the call message (e.g., a URI to which the message is transmitted), rather than via the content of the message itself. The request method used by the message may specify a desired action to be undertaken with respect to the message. For example, an HTTP POST request may be utilized to request execution of a task, while other request methods may be associated with other functionalities (e.g., an HTTP GET request may be utilized to request output from a task, as will be described below with reference to FIG. 13). Illustratively, generation of a call message at Task A 1202 may be facilitated at least in part via calls to a library or other code dependency of Task A 1202, which may be authored by a provider of the coordinator 114 (e.g., as opposed to an end user of the coordinator 114, an author of Task A 1202, etc., who may be different from the provider of the coordinator 114). For example, Task A 1202 may be generated using a software development kit, that causes Task A 1202 to include a library providing a "execute task" function, that, when called, will generate a call message for transmission to the communication manager 260.

At (2), Task A 1202 transmits the call message to a URI associated with the communication manager 260. Illustratively, the communication manager 260 may implement an HTTP server listening for requests on a designated port of the coordinator 114, and Task A 1202 may transmit the call message to a URI including a network address or domain name of the coordinator 114 as well as the designated port (e.g., "localhost:8888"). In some instances, the URI may further include identifying information of the task to be called. For example, each task on the coordinator 114 may be associated with a different resource path on the coordinator 114, such that Task A 1202 is associated with the path "/task_a", a Task B is associated with the path "/task_b", etc. Thus, by transmitting the call message to a path associated with a called task, the communication manager 260 can be informed of the called task. In the illustrative example of FIG. 12, it is assumed that an execution of Task A 1202 desired to call for an execution of a Task B. Thus, the execution of Task A 1202 may transmit the call message to a URI associated with Task B, such as "localhost:8888/task_b". As noted above, the request method used to transmit the call may designate a desired action with respect to the called task. For example, a "POST" method request to a URI associated with a task may indicate a desire to initiate an execution of the task (e.g., according to the parameters or metadata included within the request).

At (3), on receiving the call message, the communication manager 260 identifies a called task corresponding to the call message. Illustratively, the communication manager 260 may maintain a mapping or other information associating a path or URI of a call message (e.g., "localhost:8888/task_b" or "/task_b") with a corresponding identifier of a task on the coordinator 114 (e.g., the name "Task B" or a unique identifier corresponding to the task, as utilized for example by the scheduler 256). Thereafter, at (4), the communication manager 260 can generate a call to the identified task, according to the content of the call message (e.g., with parameters included in the call message, designating execution parameters or metadata included within the call message, etc.). The communication manager 260 can then transmit the task call to the scheduler 256 for placement into a work item queue 800. The scheduler 256 may then cause execution of the called task, for example in accordance with the interactions of FIGS. 8 and 9. Illustratively, the communication manager 260 may generate and transmit a task call by use of a programmatic interface (e.g., an API) to the scheduler 256. For example, the communication manager 260 may call a function corresponding to code to pass a task call to the scheduler 256, where the parameters of the function designate parameters to be passed to a task execution, parameters for handling the call (e.g., a priority level), etc. In some instances, the generated call may include an execution identifier, usable to track a task execution corresponding to the call. The execution identifier may correspond, for example, to a unique number or alphanumeric string assigned to the call, and usable (for example) to report outputs or results of a task execution corresponding to the call, as discussed below with respect to FIG. 13. In one embodiment, the execution identifier is assigned to the call by the communication manager 260. In another embodiment, the execution identifier is assigned to the call by the calling task, such as Task A 1202.

At (6), the communication manager 260 can further return an acknowledgement to the calling task, Task A 1202. The acknowledgement can indicate, for example, that the call message was received and successfully processed by the communication manager 260, and thus that a call to execute a task has been transmitted to the scheduler 256 and placed on the work item queue 800. In other instances, the acknowledgement may indicate non-successful processing of a call message, such as detection of an error in the message, in the handling of the message by the communication manager 260, or in the handling of the message by the scheduler 256. The acknowledgement message can further include an execution identifier corresponding to the call message (e.g., in instances where the execution identifier has been assigned by the communication manager 260).

While illustrative interactions are described with respect to FIG. 12, embodiments of the present disclosure may include additional or alternative interactions. For example, the communication manager 260 may in some instances validate call messages, such as by authenticating the call message according to any of a number of known authentication messages. As noted above, in some embodiments the communication manager 260 may enable transmission of call messages according to multiple protocols (or multiple versions of the same protocol). Further, the communication manager 260 may in some instances enable secure transmission of call messages or other information, such as by implementation of HTTP over Secure Sockets Layer (SSL)/Transport Layer Security (TLS), referred to in the art as "HTTPS."

In addition to enabling a first task execution to transmit a request a second task execution, it may be beneficial to enable a first task execution to obtain a result or output of a second task execution. For example, an execution of a first task may transmit a call to an execution of a second task, such as a task to interact with a coordinated device 112 and obtain a state of that device 112. The execution of the first task may therefore benefit from receiving the state of the device 112 from the execution of the second task. As in the interactions of FIG. 12 discussed above, transmittal of data between the task executions may raise difficulties such as incompatibilities between languages or delays associated with asynchronous execution. Thus, the communication manager 260 can further enable outputs or results of a task (e.g., the execution of the second task) to be provided to a calling task (e.g., the execution of the first task).

Interactions for use of a communication manager 260 to provide outputs or results of a task execution will be described with reference to FIG. 13. Specifically, the interactions of FIG. 13 may enable a task execution, identified as Task B 1204 of FIG. 13, to report an output or result of execution to a calling task execution, identified as Task A 1202 of FIG. 13. In some instances, the interactions of FIG. 13 may occur subsequent to transmission, by Task A 1202, of a request to execute Task B 1204. In the illustrative example of FIG. 13, one potential ordering of interactions is depicted for illustrative purposes, in which TASK A 1202 transmits a request to the communication manager 260 to obtain an output from TASK B 1204, prior to that output being received at the communication manager 260. This ordering of interactions may occur, for example, where Task A 1202 and the communication manager 260 utilize HTTP "long polling," a technique whereby Task A 1202 initiates an HTTP connection with the communication manager 260 without requiring an immediate response, such that the communication manager 260 may use the existing HTTP connection to notify Task A 1202 of new information (e.g., an output of Task B 1204). Other orderings of interactions are possible. For example, Task A 1202 may transmit a request to the communication manager 260 to obtain an output of Task B 1204 after the communication manager 260 has obtained that output, in which instance the communication manager 260 may respond to the request immediately. As a further example, the communication manager 260 may in some embodiments utilize "push" communication mechanisms to notify Task A 1202 of an output of Task B 1204 without requiring Task A 1202 to initiate a connection with the communication manager 260. Thus, the ordering depicted in FIG. 13 is intended to be illustrative in nature.

At (2), Task A 1202 transmits the response request message to the communication manager 260. Illustratively, where the response request message is an HTTP message, the message may be transmitted to a URI associated with the communication manager 260 (e.g., "localhost:8888"). In some instances, the response request message may include the execution identifier identifying the task execution from which an output is sought. For example, the response request message may include the execution identifier as a header within an HTTP message addressed to a URI associated with a task from which an output is requested. In other instances a URI to which the message is transmitted may include the execution identifier as part of a path within the URI. For example, a request for an output of a task execution corresponding to execution identifier "1" may be transmitted to "http://localhost:8888/1," where execution identifiers are unique across tasks at a coordinator 114. Where execution identifiers are not unique across tasks, or when it is otherwise desirable, an identifier of a task from which output is requested may also be included within a path of a URI. For example, a request for an output of execution "1" of "Task B" may be transmitted to "http://localhost:8888/task_b/1." The request can illustratively include parameters for processing of the request at the communication manager 260, such as a timeout period of the request, such that if the communication manager 260 does not obtain a response within the timeout period, an error message is returned to Task A 1202. In some instances, the request may include criterion designating when and if the communication manager 260 should return information to Task A 1202 in response to the request, such as notifying Task A 1202 only when the output of Task B 1204 conforms to specified criteria (e.g., absolute values, threshold values, value ranges, etc.). As noted above, transmission of the response request message may occur in accordance with an HTTP long polling technique, such that a connection between Task A 1202 and the communication manager 260 is maintained without requiring that the communication manager 260 immediately respond to the message.

Figure 13:
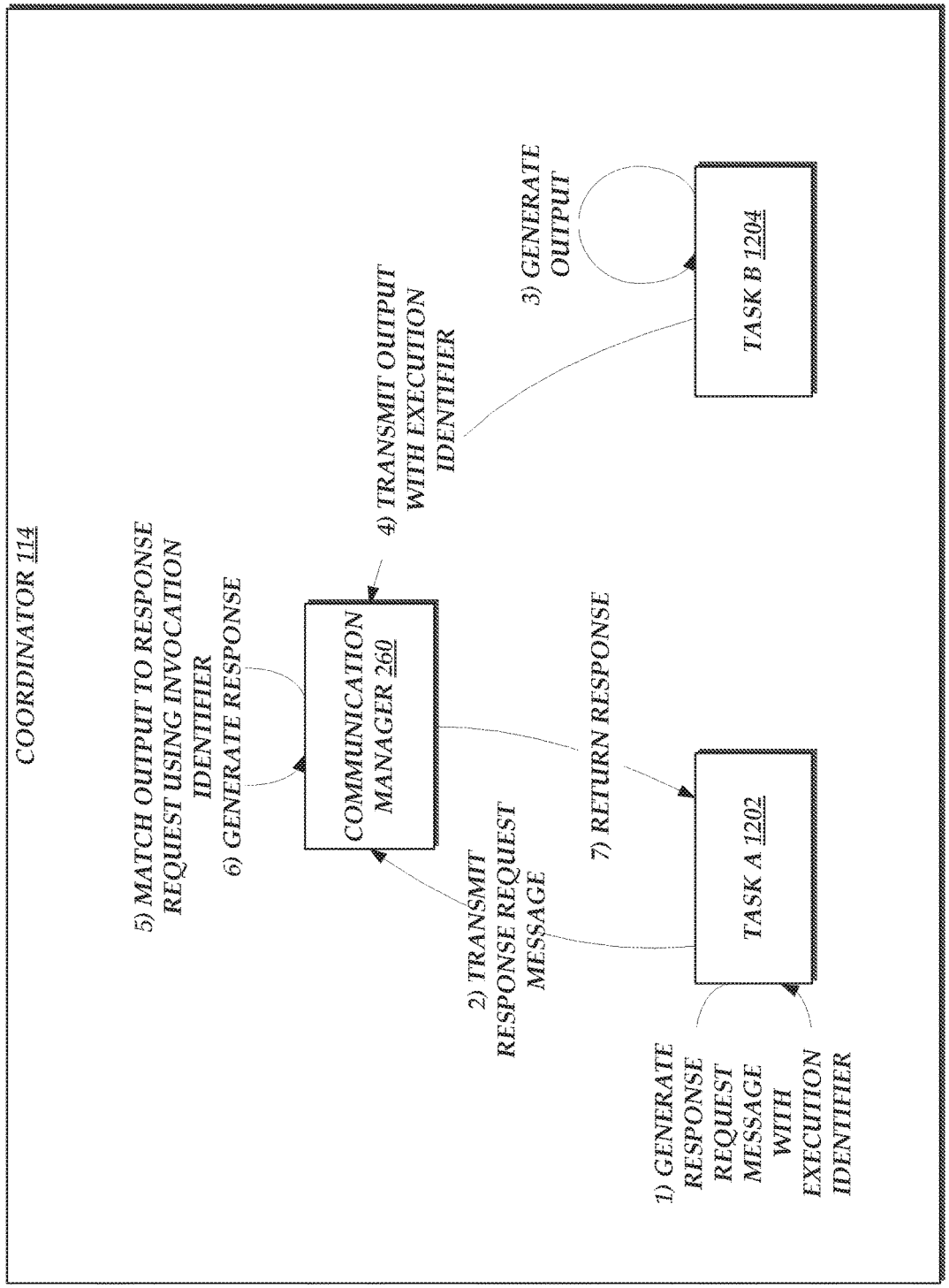
FIG. 13 is a flow diagram depicting illustrative interactions for the use of a communication manager to provide an output of a first task execution to a caller of the first task execution on a coordinator of FIG. 1.

In the illustrative example of FIG. 13, at (3), Task B 1204 generates an output. The output may be any data generated by virtue of execution of code corresponding to Task B 1204, such as a result of processing inputs passed to Task B 1204 (e.g., as part of a call to execute Task B 1204), data obtained from a coordinated device 112 during execution of Task B 1204 (e.g., where Task B 1204 corresponds to code to interact with a coordinated device 112), etc. At (4), the output is transmitted to the communication manager 260 using the execution identifier assigned to the execution of Task B 1204. Illustratively, the output may be transmitted to Task B as an HTTP request utilizing the HTTP POST method, with content including the output. In one embodiment, the request may include an execution identifier corresponding to the task generating the output (e.g., as a header to the request). The request may be transmitted to a URI associated with the execution identifier and/or with Task B 1204, which may match the URI discussed above with respect to interaction (2) (e.g., "http://localhost:8888/1" or "http://localhost:8888/task_b").

At (5), the communication manager 260 matches the output provided by Task B 1204 to the request message transmitted by Task A 1202, such as by detecting that both messages are transmitted to a common URI and include a common execution identifier (e.g., within the URI or within a header field). At (6), the communication manager generates a response to the request messages of Task A 1202, including the output provided by Task B 1204. In the embodiment depicted in FIG. 13, where the response request message transmitted at interaction (2) represents an implementation of an HTTP long polling technique, the response generated at interaction (6) may be a response to the request message of interaction (2). In other embodiments, interaction (6) may include generation of an independently transmitted message (e.g., a "push" message to Task A 1202).

At (7), the response generated at the communication manager 206, including the output of Task B 1204, is transmitted to Task A 1202. Accordingly, Task A 1202 may obtain an output generated by Task B 1204, and intra-task communication can be enabled. As will be appreciated in view of the description above, the use of a communication manger 260 to enable intra-task communication may include a number of benefits. For example, each task (e.g., Task A 1202 and Task B 1204) may communicate with the communication manager 260 via different protocols, or different versions of the same protocol. Moreover, the intra-task communications depicted in FIG. 13 are not dependent on a particular language of a task, and may between tasks written in different languages, so long as each language can implement a protocol supported by the communication manager 260. In addition, functionality of the communication manager 260 is not dependent on the content of intra-task communications (e.g., the message body), but may be capable of operating solely based on addresses to which communications are transmitted or header values associated with the communications. In this way, tasks may be enabled to transmit data of any format without requiring alteration to the functionality of the communication manager 260. Still further, the communication manager 260 described herein can implement various functionalities on behalf of tasks, such that those tasks need not implement those functionalities themselves. For example, the communication manager 206 may authenticate communications with one or more tasks, validate requests from the tasks, and implement timeouts or error controls with respect to requests (e.g., to enable robust asynchronous calls). In some instances, the communication manager 260 may implement "quality of service" guarantees, such as by retransmitting failed communications with tasks to ensure that a task receives and processes a communication. The communication manager 260 thus provides substantial advantages over direct communication between individual task executions.

Figure 14:
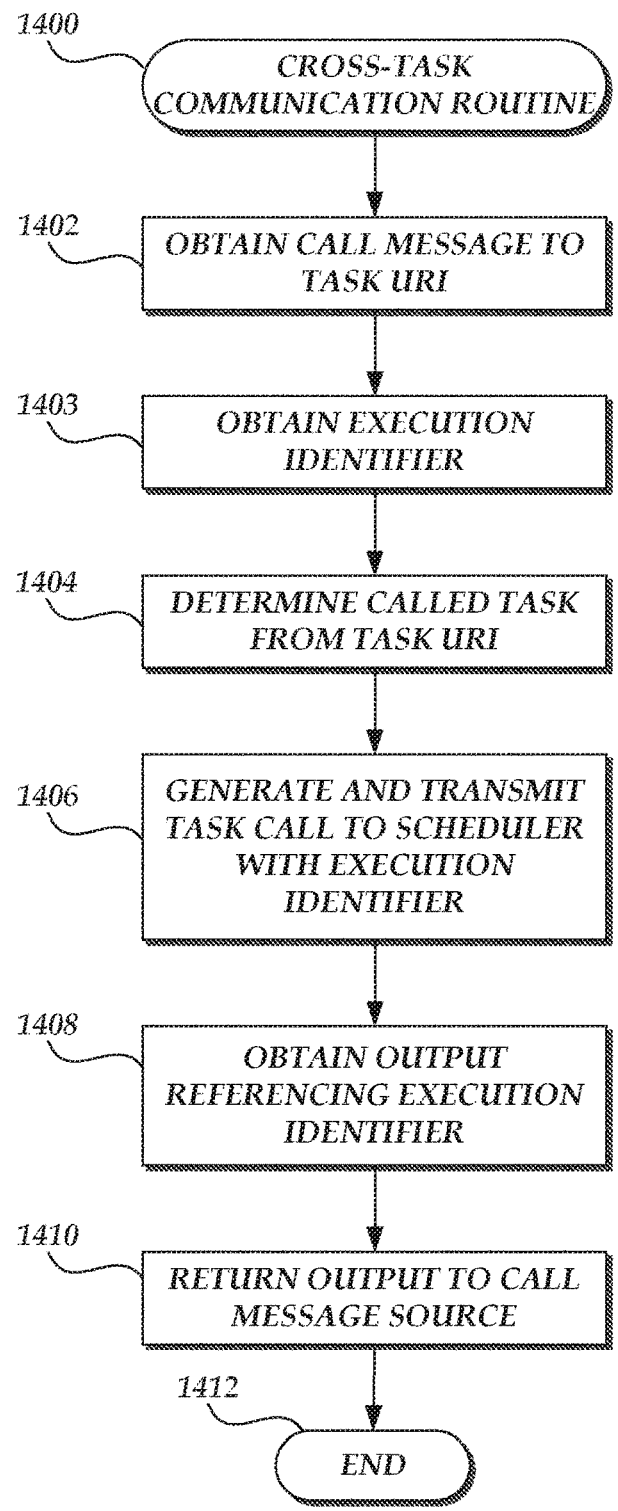
FIG. 14 depicts an illustrative cross-task communication routine that may be implemented by a communication manager within a coordinator of FIG. 1.

With reference to FIG. 14, an illustrative cross-task communication routine 1400 will be described. The routine 1400 may be implemented, for example, by a communication manager 260, to enable communications between executions of tasks on a coordinator 114.

The routine 1400 begins at block 1402, where the communication manager 260 obtains a call message addressed to a URI associated with task. Illustratively, the call message may be an HTTP POST request to a URI including a domain name of the coordinator 114, a port associated with an HTTP server implemented by the communication manager 260, and a path associated with the called task (e.g., in the format of "http://<domain>:<port>/<path>"). At block 1403, the communication manager 260 obtains an execution identifier to be associate with the call, which can be utilized (as described below) to return to a calling entity, such as a calling tasks, outputs or results of an execution corresponding to the call. In one embodiment, the execution identifier is transmitted within the call message (e.g., as contents of the POST request). In another embodiment, the execution identifier is assigned to the call by the communication manager 260, and may be returned to a calling entity (e.g., as part of an acknowledgement of or response to the POST request).

At block 1404, the communication manager 260 determines, based on a URI to which the call message was transmitted, a task to be called in response to the call message. For example, the communication manager 260 may maintain a mapping or other information associating a path of a URI (e.g., "/task_identifier") to a particular task maintained at a coordinator 114 (e.g., "Task X"). Thus, by inspecting a path to which the call message was transmitted, the communication manger 260 may determine a task to call in response to the call message.

At block 1406, the communication manager 260 generates a call to execute the task identified in block 1404, and transmits the call to a scheduler of the coordinator 114 (which, as discussed above, may function to enqueue the call and to cause execution of the called task in accordance with a work item queue). Illustratively, the call may include parameters to be passed to an execution of a task, or parameters regarding how the task should be executed (e.g., a priority to assign to the execution). Such parameters may be obtained, for example, from the call message obtained at block 1402. The call can further include the execution identifier associated with the call, as obtained at block 1403, such that a task execution initiated by the call may report results of the call to the communication manager 260 by reference to the execution identifier.

At block 1408, the communication manager 260 obtains an output or other data regarding execution of a task corresponding to the call, referencing the execution identifier. Illustratively, the output may be transmitted as an HTTP POST message to a server corresponding to the communication manager 260, addressed to a path including the execution identifier, and including content corresponding to the output. In another embodiment, the output may be transmitted as an HTTP post message, with contents including the execution identifier.

At block 1410, the communication manager 260 returns the output to a source of the call message. In one embodiment, the communication manager 260 may return the output as a response to a request for that output, where the request includes the execution identifier. For example, the communication manager 260 may return the output as a response to an HTTP GET method message transmitted to a URI including the execution identifier. In another embodiment, the communication manager 260 may transmit the output independently (e.g., as a "push" notification) to an entity from the call message was received. While a return to a source of the call message is described in FIG. 14, the communication manager 260 may additionally or alternatively return the output to another destination. For example, the call message or another communication received at the communication manager 260 (e.g., another communication referencing the execution identifier) may specify an alternative destination for an output corresponding to the execution identifier, and the routine 1400 may include returning the output to that alternative destination. Illustratively, the use of alternative destinations may enable rerouting of outputs between tasks. For example, a first task may call for execution of a second task, and pass a previously established execution identifier (e.g., corresponding to an execution of a third task) as a parameter to the second task. The second task may then utilize the execution identifier to obtain an output of the third task, even if the second task was not responsible for originally invoking the execution of the third task. Thus, a return of the output to a call message source is simply one possible destination for the output. After returning the output, the routine 1400 may end at block 1412.

Figure 15:
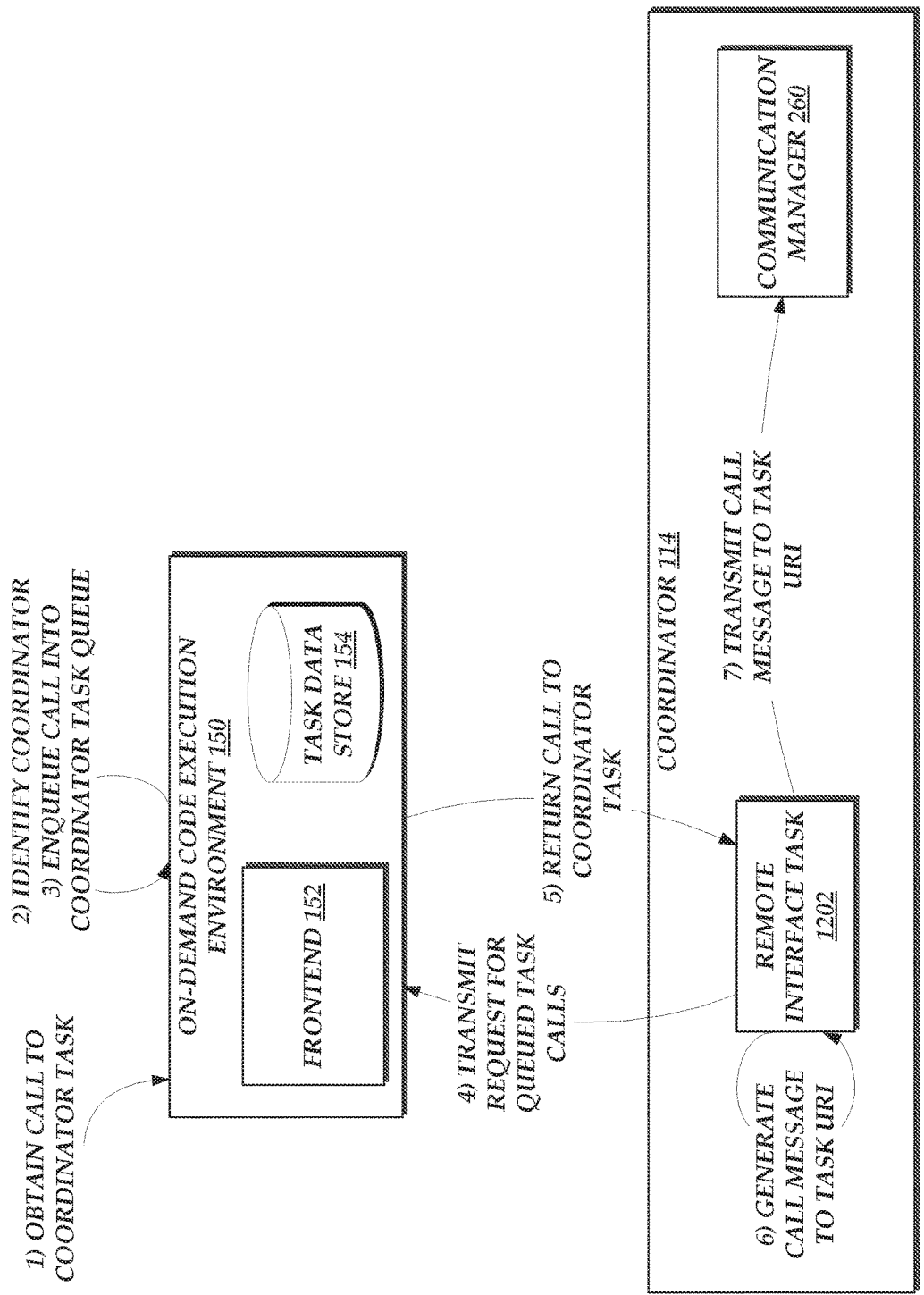
FIG. 15 is a flow diagram depicting illustrative interactions for the use of a remote interface task to call a first task execution on a coordinator of FIG. 1 via a second task execution on an external on-demand code execution environment 150.

With reference to FIG. 15, illustrative interactions are depicted for enabling intra-task communications between a task execution on an on-demand code execution environment 150 and a task executing (or to-be-executed) on a coordinator 114. As discussed above, it may in some instances (and under certain configurations) be difficult for a task executing at the on-demand code execution environment 150 to communication with a coordinator 114. For example, the coordinator 114 may not be associated with a publically addressable network, may be subject to security policies that limit establishment of communications to the coordinator 114 from outside the coordinated environment 120, or may not maintain reliable communications with the on-demand code execution environment 150 (e.g., may be subject to high network latencies or transmission errors in communicating with the on-demand code execution environment 150). To address such difficulties, a coordinator 114 may implement a remote interface task 1202, executing on a coordinator 114, to continuously, intermittently, or periodically retrieve requests from an on-demand code execution system to execute tasks on the coordinator 114, and to report results of such executions to the on-demand code execution environment 150.

The interactions of FIG. 15 begin at (1), where the on-demand code execution environment 150 obtains a call to execute a task at a coordinator 114. Illustratively, the call may be obtained by a task executing at the on-demand code execution environment 150, or by a client device 102 transmitting a call to the on-demand code execution environment 150 (e.g., via an API of the on-demand code execution environment 150). The call may include, for example, identifying information of a task to be called, as well as a coordinator 114 on which to execute the task. In some instances, the call may further include other information, such as parameters to pass to the task prior to or during execution, or parameters for controlling how the task executes (e.g., a priority of the task). Identifying information of a task to be called may include, for example, a name or other identifier of a task on the coordinator 114, on the on-demand code execution environment 150, or both. Identifying information for a coordinator 114 may include, for example, a name or other identifier of a coordinator 114, or a name or other identifier of a coordinated environment 110 in which the coordinator 114 operates (e.g., in instances where only a single coordinator 114 is included within such an environment 110). In some instances, identifying information of the coordinator 114 may include designation of an account on the on-demand code execution environment 150 with which the coordinator 114 is associated.

At (2), the on-demand code execution environment 150 identifies a coordinator 114 to which the call should be transmitted. Illustratively, the on-demand code execution environment 150 may extract the identifying information for the coordinator 114 from the call, in order to determine a particular coordinator 114 to which the call should be transmitted. Thereafter, at (3), the on-demand code execution environment 150 enqueues the call in a queue of calls awaiting retrieval by the coordinator 114. Illustratively, the on-demand code execution environment 150 may generate, for each coordinator 114 enabled to obtain task calls from the on-demand code execution environment 150, a queue of call awaiting transmittal to the coordinator 114. Thus, the on-demand code execution environment 150 may place the currently obtained call onto a queue corresponding to a destination coordinator 114. In some instances, the on-demand code execution environment 150 may operate the queue according to a first-in-first-out scheduling algorithm. In other instances, the on-demand code execution environment 150 may apply other scheduling algorithms (such as those discussed above) to the queue.

At (4), a remote interface task 1202 executing on a coordinator 114 transmits a request to the on-demand code execution environment 150 to retrieve task calls queued at the on-demand code execution environment 150. The remote interface task 1202 may be implemented as a task at the coordinator 114, in accordance with the embodiments described herein. Illustratively, the remote interface task 1202 may correspond to code executable to continuously, intermittently or periodically interact with the on-demand code execution environment 150 to retrieve task calls queued at the on-demand code execution environment 150 for execution on the coordinator 114. In one embodiment, the request to retrieve task calls may be an HTTP request (e.g., a GET method request), addressed to a URI of the on-demand code execution environment 150. Illustratively, the URI may include a path designated by the on-demand code execution environment 150 as corresponding to the coordinator 114.

At (5), the on-demand code execution environment 150 returns the queued call to the remote interface task 1202 in response to the request. In one embodiment, the on-demand code execution environment 150 may return all queued task calls to the coordinator 114. In another embodiment, the on-demand code execution environment 150 may include only a threshold number of queued task calls per request from the coordinator 114 (e.g., the highest-ordered call from the queue, or the highest-ordered n calls).

At (6), the remote interface task 1202 generates a call message corresponding to a call retrieved from the on-demand code execution environment 150. In one embodiment, the coordinator 114 may utilize information from the retrieved call to generate a new call, according to formatted utilized by the coordinator 114. For example, as described above, the coordinator 114 may include a communication manager 260 configured to obtain calls to execute tasks according to a given format (e.g., as an HTTP POST request addressed to a URI identifying a called task and including parameters regarding execution of the task as content of the request). Thus, the remote interface task 1202 may utilize information from a retrieved call (e.g., the content of an HTTP packet transmitted by the on-demand code execution environment 150) to generate a new call according to the format utilized by the communication manager 260. In another embodiment, the on-demand code execution environment 150 may be configured to return task calls as encapsulated data packets, such that it may be decapsulated remote interface task 1202 and transmitted within the coordinator 114 without requiring independent generation of a new call.

At (7), the coordinator 114 transmits the call to the communication manager 260. The call may be transmitted in accordance with the embodiments described above (e.g., as an HTTP POST request addressed to a URI identifying a called task). Thereafter, the communication manager 260 may operate to cause the call to be enqueued on a work item queue of the coordinator 114, and executed in an execution environment of the coordinator 114. Interactions for processing calls to execute tasks are described above with respect to FIGS. 8-13. Thus, via the interactions of FIG. 15, the on-demand code execution environment 150 may operate to cause execution of tasks on a coordinator 114.

While illustrative interactions are depicted in FIG. 15 for use of a remote interface task 1202 to initiate execution of tasks on a coordinator 114 via an on-demand code execution environment 150, the remote interface task 1202 may in some instances implement additional functionalities. For example, the remote interface task 1202 may operate to obtain an output or result of execution of a task at the coordinator 114 (e.g., in accordance with the interactions of FIG. 13) and to return such an output or result to the on-demand code execution environment 150. Illustratively, the output or result may be returned to the on-demand code execution environment 150 and include an execution identifier of the task (which may be assigned, for example, by a calling entity or the on-demand code execution environment 150). The on-demand code execution environment 150 may further function to return the output or result to a calling entity, similarly to as is described above with reference to FIG. 13.

Figure 16:
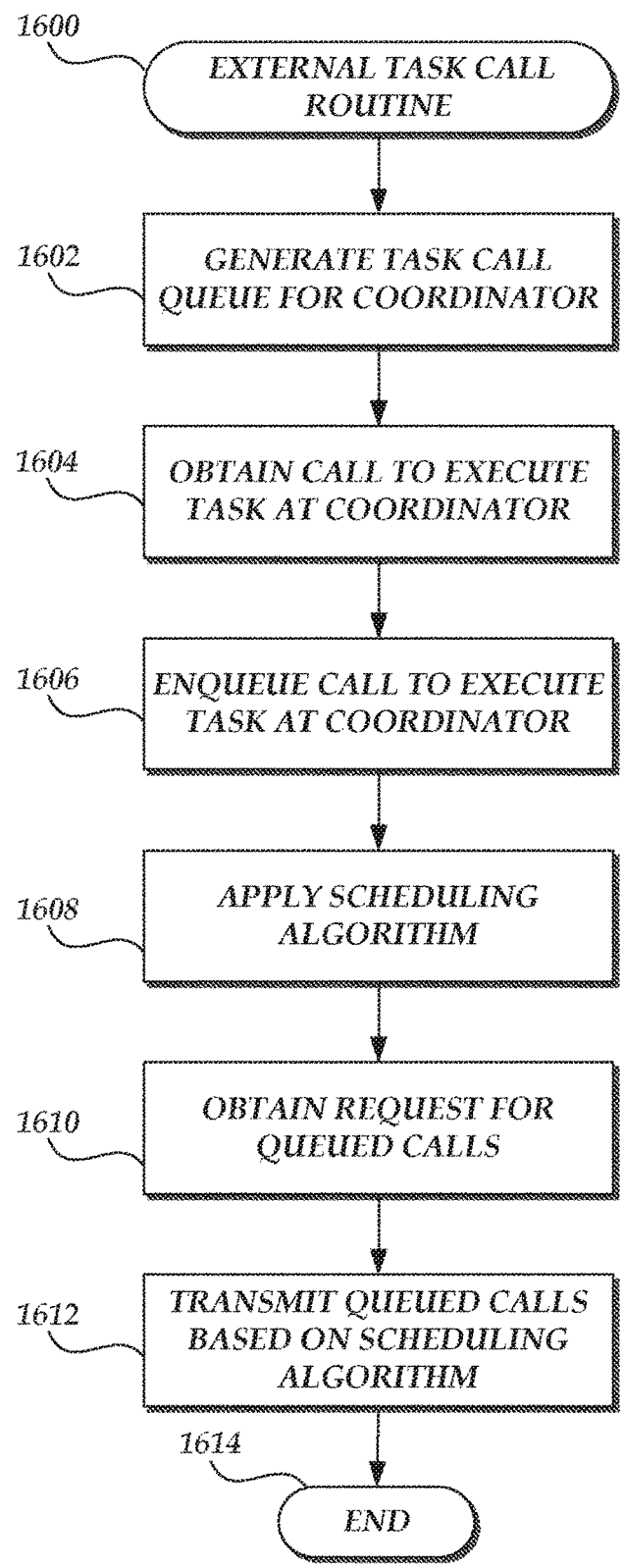
FIG. 16 depicts an illustrative external task call routine that may be implemented by a remote interface task executing on a coordinator of FIG. 1.

With reference to FIG. 16, an illustrative external task call routine 1600 will be described. The routine 1600 may be implemented, for example, by an on-demand code execution environment 150 (e.g., via a frontend 152 of the on-demand code execution environment 150). The routine 1600 begins at 1602, where the on-demand code execution environment 150 generates a task call queue for a coordinator 114. The task call queue may be implemented as a logical structure within memory of the on-demand code execution environment 150, and be configured to store calls to execute tasks at the coordinator 114. The task call queue may be associated with a resource identifier, such as a URI, to enable devices to request execution of a task on the coordinator 114 to which the queue corresponds.

At block 1604, the on-demand code execution environment 150 obtains a call to execute a task on the coordinator 114. The call may be obtained, for example, via an API of the on-demand code execution environment 150, and may be generated by client devices 102, tasks executing on the on-demand code execution environment 150, tasks executing on coordinators 114, or other devices. The call may include parameters to be passed to the task, or parameters regarding execution of the task (e.g., a priority).

At block 1606, the on-demand code execution environment 150 enqueues the call within the task call queue corresponding to the coordinator 114 on which the task is intended to execute. In some instances, the on-demand code execution environment 150 may undertake additional actions prior to placing a call on the queue, such as validating the call (e.g., to ensure it includes proper authentication information, formatting, etc.) or assigning an execution identifier to the call. The on-demand code execution environment 150 may then, at block 1608, apply a scheduling algorithm to the queue to sort calls within the queue according to a determined ordering. The scheduling algorithm may include, for example, a weighted round robin algorithm.

At block 1610, the on-demand code execution environment 150 obtains a request from a coordinator 114 to provide calls on the queue corresponding to the coordinator 114. The request may be generated, for example, by a remote interface task executing on the coordinator 114. In one embodiment, the request is an HTTP GET method request addressed to a URI corresponding to the queue.

Thereafter, at block 1612, the on-demand code execution environment 150 transmits calls within the queue according to the ordering of the queue according to the scheduling algorithm. In one embodiment, the on-demand code execution environment 150 may transmit all queued calls to the coordinator 114. In another embodiment, the on-demand code execution environment 150 may transmit only a threshold number (e.g., one) call to a coordinator 114 in response to a given request, and the coordinator 114 may transmit multiple requests to receive queued calls. Illustratively, transmission of the call may include encapsulation of the call into a format suitable for transmission to the coordinator over a public network (e.g., the network 104), such that the call may be decapsulated at the coordinator 114 and transmitted to a communication manager of the coordinator 114, without independent recreation of the call. Thus, the coordinator 114 (e.g., via a remote interface task) may obtain calls to execute tasks, as submitted to the on-demand code execution environment 150. The coordinator 114 may thereafter process the calls in accordance with the embodiments described above, in order to undertake a desired functionality, such as managing operation of a coordinated device 112. The routine 1600 may then end at block 1614.

As noted above, the on-demand code execution environment 150 may in some instances implement additional functionality, such as retrieval of outputs of a task executed on a coordinator 114. In such instances, the routine 1600 may be modified to include additional elements, or a new routine may be implemented by the on-demand code execution environment 150 to facilitate retrieval of outputs of a task executed at a coordinator 114. For example, the on-demand code execution environment 150 may await reporting of an output of a task, as delivered to the on-demand code execution environment 150 by a remote interface task (e.g., as an HTTP POST method request addressed to a URI including an execution identifier of the task). The on-demand code execution environment 150 may then transmit a notification of the output to a calling entity (e.g., as a "push" notification), or may store the output such that a calling entity may retrieve the output by requesting it from the on-demand code execution environment 150 (e.g., via an HTTP GET method request addressed to a URI including an execution identifier of the task). Thus, the on-demand code execution environment 150 may in some instances operate similarly to a communication manager of a coordinator 114. In other embodiments, the on-demand code execution environment 150 may exclude such functionality, and a remote interface task executing on a coordinator 114 may report outputs of task executions via other mechanisms, such as storing such outputs on a network-attached storage system accessible via the network 104.

Various example embodiments of the disclosure can be described by the following clauses:

Clause 1. A system to remotely configure a coordinator computing device managing operation of coordinated devices, the system comprising:
 a non-transitory data store including a device shadow for the coordinator computing device, the device shadow indicating a version identifier for a desired configuration of the coordinator computing device;
 a deployment device in communication with the non-transitory data store, the deployment device comprising a processor configured with computer-executable instructions to:
  obtain configuration information for the coordinator computing device, the configuration information indicating one or more coordinated devices to be managed by the coordinator computing device and one or more tasks to be executed by the coordinator computing device to manage the one or more coordinated devices, wherein individual tasks of the one or more tasks correspond to code executable by the coordinator computing device, and wherein the configuration information further specifies an event flow table indicating criteria for determining an action to be taken by the coordinator computing device in response to a message obtained from an execution of the one or more tasks;
  generate a configuration package including the configuration information, wherein the configuration package is associated with an additional version identifier;
  modify the device shadow to indicate that the desired configuration corresponds to the additional version identifier;
  notify the coordinator computing device of the modified device shadow;
  obtain a request from the coordinator computing device for the configuration package; and
  transmit the configuration package to the coordinator computing device, wherein the coordinator computing device is configured to utilize the configuration package to retrieve the one or more tasks to be executed by the coordinator computing device to manage the one or more coordinated devices indicated within the configuration package.

Clause 2. The system of Clause 1, wherein the processor is further configured with computer-executable instructions to obtain a subscription for the coordinator computing device to a topic corresponding to the device shadow, and wherein the processor is configured to notify the coordinator computing device of the modified device shadow as a notification of a publication to the topic.

Clause 3. The system of Clause 2, wherein the notification is transmitted via MQTT protocol.

Clause 4. The system of Clause 1, wherein the coordinated devices comprise at least one of a general purpose computing device, a thin device, or an embedded device associated with an alternative primary function.

Clause 5. The system of Clause 1 further comprising the coordinator computing device, wherein the coordinator computing device comprising a processor and memory collectively configured to manage a state of the coordinated devices.

Clause 6. A computer-implemented method comprising:
 obtaining a registration of a coordinator computing device, wherein the coordinator computing device is associated with a coordinated environment comprising one or more coordinated devices to be managed by the coordinator computing device;
 generating a device shadow for the coordinator computing device, the device shadow indicating a version identifier for a desired configuration of the coordinator computing device;
 obtaining configuration information for the coordinator computing device, the configuration information indicating one or more tasks to be executed by the coordinator computing device to manage the one or more coordinated devices, wherein individual tasks of the one or more tasks correspond to code executable by the coordinator computing device;
 generating a configuration package including the configuration information, wherein the configuration package is associated with an additional version identifier;
 modifying the device shadow to indicate that the desired configuration corresponds to the additional version identifier;
 notifying the coordinator computing device of a modification to the device shadow;
 obtaining a request from the coordinator computing device for the configuration package; and
 transmitting the configuration package to the coordinator computing device, wherein the coordinator computing device is configured to utilize the configuration package to retrieve the one or more tasks to be executed by the coordinator computing device to manage the one or more coordinated devices indicated within the configuration package.

Clause 7. The computer-implemented method of Clause 6, wherein the configuration package further includes an event flow table indicating criteria for determining an action to be taken by the coordinator computing device in response to a message obtained at the coordinator computing device from at least one of a task of the one or more tasks or a coordinated device of the one or more coordinated devices.

Clause 8. The computer-implemented method of Clause 6, wherein the configuration package further includes a security certificate to be used in communications between the coordinated devices and the coordinator computing device.

Clause 9. The computer-implemented method of Clause 6, wherein the configuration package further includes an indication of a set of device shadows to be maintained by the coordinator computing device, individual device shadows of the set of device shadows corresponding to individual coordinated devices of the one or more coordinated devices.

Clause 10. The computer-implemented method of Clause 6, wherein obtaining the registration of the coordinator computing device comprising obtaining a subscription for the coordinator computing device to a topic corresponding to the device shadow, and wherein notifying the coordinator computing device of the modified device shadow includes transmitting a notification to the coordinator computing device of a publication to the topic.

Clause 11. The computer-implemented method of Clause 6 further comprising:
obtaining at least one task of the one or more tasks from a client computing associated with a user of the coordinator computing device;
receiving a request for the at least one task in response to processing of the configuration package at the coordinator computing device; and
providing the at least one task to the coordinator computing device.

Clause 12. The computer-implemented method of Clause 6 further comprising:
obtaining updated configuration information for the coordinator computing device;
generating an updated configuration package from the updated configuration information, wherein the configuration package is associated with an updated version identifier;
modifying the device shadow to indicate that the desired configuration corresponds to the updated version identifier;
notifying the coordinator computing device of a modification to the device shadow;
obtaining a request from the coordinator computing device for the configuration package; and
transmitting the updated configuration package to the coordinator computing device.

Clause 13. Non-transitory computer-readable media comprising computer executable instructions that, when executed by a deployment system, cause the deployment system to:
generate a device shadow for a coordinator computing device, the device shadow indicating a version identifier for a desired configuration of the coordinator computing device, wherein the coordinator computing device is associated with a coordinated environment comprising one or more coordinated devices to be managed by the coordinator computing device;
obtain configuration information for the coordinator computing device, the configuration information indicating one or more tasks to be executed by the coordinator computing device to manage the one or more coordinated devices, wherein individual tasks of the one or more tasks correspond to code executable by the coordinator computing device;
modify the device shadow to indicate that the desired configuration corresponds to the additional version identifier;
notify the coordinator computing device of the modified device shadow;
obtain a request from the coordinator computing device for the configuration package; and
transmit the configuration package to the coordinator computing device, wherein the coordinator computing device is configured to utilize the configuration package to retrieve the one or more tasks to be executed by the coordinator computing device to manage the one or more coordinated devices indicated within the configuration package.

Clause 14. The non-transitory computer-readable media of Clause 13, wherein the computer executable instructions further cause the deployment system to:
obtain executable code corresponding to the one or more tasks, where the one or more tasks comprise:
a first task executable by the coordinator computing device to generate device shadows for individual coordinated devices of the one or more coordinated devices; and
a second task executable by the coordinator computing device to route messages addressed to at least one of the one or more coordinated devices or at least one of the one or more tasks;
obtain a request from the coordinator computing device for the one or more tasks; and
transmit the one or more tasks to the coordinator computing device.

Clause 15. The non-transitory computer-readable media of Clause 14, wherein the one or more tasks further comprise a third task executable by the coordinator computing device to enable communication according to a protocol associated with the task.

Clause 16. The non-transitory computer-readable media of Clause 14, wherein the configuration package further includes an indication of a set of device shadows to be maintained by the coordinator computing device, individual device shadows of the set of device shadows corresponding to individual coordinated devices of the one or more coordinated devices.

Clause 17. The non-transitory computer-readable media of Clause 14, wherein the computer executable instructions further cause the deployment system to obtain a subscription for the coordinator computing device to a topic corresponding to the device shadow, and wherein the computer executable instructions cause the deployment system to notify the coordinator computing device of the modified device shadow by transmitting a notification to the coordinator computing device of a publication to the topic.

Clause 18. The non-transitory computer-readable media of Clause 14, wherein the computer executable instructions further cause the deployment system to:
obtain at least one task of the one or more tasks from a client computing associated with a user of the coordinator computing device;
receive a request for the at least one task in response to processing of the configuration package at the coordinator computing device; and
provide the at least one task to the coordinator computing device.

Clause 19. The non-transitory computer-readable media of Clause 14, wherein the computer executable instructions further cause the deployment system to:
obtain updated configuration information for the coordinator computing device;
generate an updated configuration package from the updated configuration information, wherein the configuration package is associated with an updated version identifier;
modify the device shadow to indicate that the desired configuration corresponds to the updated version identifier;
notify the coordinator computing device of a modification to the device shadow;
obtain a request from the coordinator computing device for the configuration package; and
transmit the updated configuration package to the coordinator computing device.

Clause 20. The non-transitory computer-readable media of Clause 14, wherein at least one task of the one or more tasks is executable on both the coordinator computing device and within an on-demand code execution system distinct from the coordinator computing device.

Clause 21. A system for managing resources within a coordinator computing device configured to manage one or more coordinated devices within a coordinated environment, the system comprising:
- a non-transitory data store including computer executable instructions corresponding to:
  - a scheduler that, when executed, implements a queue of calls to execute one or more tasks on the coordinator, wherein individual tasks of the one or more tasks correspond to code executable by the coordinator computing device to manage operation of the one or more coordinated devices within the coordinated environment;
  - a resource manager that, when executed, generates execution environments in which to execute the one or more tasks;
- a processor in communication with the non-transitory data store and configured to execute the scheduler, wherein execution of the scheduler causes the processor to:
  - enqueue a set of task calls within the queue, individual task calls corresponding to a call to execute a task of the one or more tasks;
  - obtain an availability of compute resources on the coordinator from the resource manager;
  - apply a scheduling algorithm to the queue based at least in part on the availability of compute resources to select at least one task call of the set of task calls for processing;
  - instruct the resource manager to select an execution environment in which to execute a task corresponding to the at least one task call; and
  - execute the task corresponding to the at least one task call within the execution environment;
- wherein the processor is further configured to execute the resource manager in order to generate the execution environment in which to execute the task corresponding to the at least one task call, and wherein generation of the execution environment includes provisioning the execution environment with a data resource required to execute the task corresponding to the at least one task call.

Clause 22. The system of Clause 21, wherein the coordinated devices comprise at least one of a general purpose computing device, a thin device, or an embedded device associated with an alternative primary function.

Clause 23. The system of Clause 21, wherein provisioning the execution environment with a data resource required to execute the task corresponding to the at least one task call includes provisioning the execution environment with the executable code corresponding to the task.

Clause 24. The system of Clause 21, wherein provisioning the execution environment with a data resource required to execute the task corresponding to the at least one task call includes provisioning the execution environment with at least one of a driver, a code library, data corresponding to a runtime environment, or a code utility.

Clause 25. The system of Clause 21, wherein the execution environment corresponds to a software container.

Clause 26. The system of Clause 25, wherein the data resource is stored external to the software container, and wherein provisioning the execution environment with a data resource required to execute the task corresponding to the at least one task call includes associating the software container with read-only access to the data resource.

Clause 27. The system of Clause 26, wherein associating the software container with read-only access to the data resource comprises generating a union mount combining read-only access to the data resource and read/write access to an additional memory space while presenting to the execution environment a combined view of the data resource and the additional memory space.

Clause 28. The system of Clause 21, wherein the execution environment is a first execution environment, and wherein execution of the resource manager further causes the processor to:
- obtain a request for a second execution environment in which to execute a second task;
- detect that the first task has ceased execution; and
- select the first execution environment to fulfill the request.

Clause 29. Non-transitory computer readable media including computer-executable instructions comprising:
- first instructions executable by a computing system to implement a resource manager, wherein implementation of the resource manager causes the computing system to:
  - obtain a request for an execution environment in which to execute a first task of one or more tasks, wherein individual tasks of the one or more tasks correspond to code executable by the computing system;
  - determine a set of data resources required for execution of the task; and
  - generate an execution environment for execution of the task at least in part by provisioning the execution environment with access to the set of data resources;
- second instructions executable by the computing system to implement scheduler, wherein implementation of the scheduler causes the computing system to:
  - enqueue a set of task calls within a queue, individual task calls corresponding to a call to execute a task of the one or more tasks;
  - obtain an availability of compute resources on the computing system;
  - apply a scheduling algorithm to the queue based at least in part on the availability of compute resources to select a task call of the set of task calls for processing, wherein the task call corresponds to a call to execute the first task;
  - transmit the request for the execution environment in which to execute the first task; and
  - execute the first task within the execution environment.

Clause 30. The non-transitory computer-readable media of Clause 29, wherein the execution environment is a first execution environment, and wherein implementation of the resource manager further causes the computing system to:
- obtain a request for a second execution environment in which to execute a second task;
- detect that the first task has ceased execution; and
- select the first execution environment to fulfill the request.

Clause 31. The non-transitory computer-readable media of Clause 30, wherein the first execution environment is selected based at least in part on detecting that the second task and the first task correspond to the same task.

Clause 32. The non-transitory computer-readable media of Clause 30, wherein the first execution environment is selected based at least in part on detecting that the second task depends on a data resource available to the first execution environment.

Clause 33. The non-transitory computer-readable media of Clause 30, wherein implementation of the resource manager further causes the computing system to:
determine an availability of a compute resource required by the execution environment is below a threshold level; and
suspend a second execution environment associated with usage of the compute resource.

Clause 34. The non-transitory computer-readable media of Clause 33, wherein the compute resource includes at least one of processor availability, memory availability, or network bandwidth availability.

Clause 35. The non-transitory computer-readable media of Clause 33, wherein suspension of the second execution environment includes at least one of generating snapshot image data of the second execution environment or saving a state of the second execution environment to a device shadow.

Clause 36. The non-transitory computer-readable media of Clause 30, wherein implementation of the resource manager further causes the computing system to generate the execution environment, and wherein generating the execution environment comprises generating a union mount combining read-only access to the set of data resources and read/write access to an additional memory space while presenting to the execution environment a combined view of the set of data resources and the additional memory space.

Clause 37. A computer-implemented method comprising:
enqueuing a set of task calls within a queue, individual task calls corresponding to a call to execute a task of the one or more tasks;
obtaining an availability of compute resources on the computing system;
applying a scheduling algorithm to the queue based at least in part on the availability of compute resources to select a task call of the set of task calls for processing, wherein the task call corresponds to a call to execute the first task;
determining a set of data resources required for execution of the task; and
generating an execution environment for execution of the task at least in part by provisioning the execution environment with access to the set of data resources;
executing the first task within the execution environment.

Clause 38. The computer-implemented method of Clause 37, wherein the set of data resources includes at least one of data resources or compute resources.

Clause 39. The computer-implemented method of Clause 37, wherein the execution environment corresponds to a software container, and wherein provisioning the execution environment with access to the set of data resources comprises associating the software container with read-only access to the set of data resources.

Clause 40. The computer-implemented method of Clause 39, wherein associating the software container with read-only access to the set of data resources comprises generating a union mount combining read-only access to the set of data resources and read/write access to an additional memory space while presenting to the execution environment a combined view of the set of data resources and the additional memory space.

Clause 41. The computer-implemented method of Clause 37, wherein the execution environment is a first execution environment, and wherein the computer-implemented method further comprises:
obtaining a request for a second execution environment in which to execute a second task;
detecting that the first task has ceased execution; and
selecting the first execution environment to fulfill the request.

Clause 42. The computer-implemented method of Clause 41, wherein the first execution environment is selected based at least in part on detecting at least one of that the second task and the first task correspond to the same task or that the second task depends on a data resource available to the first execution environment.

Clause 43. The computer-implemented method of Clause 37 further comprising:
determining an availability of a compute resource required by the execution environment is below a threshold level; and
suspending a second execution environment associated with usage of the compute resource.

Clause 44. The computer-implemented method of Clause 43, wherein suspending the second execution environment includes at least one of generating snapshot image data of the second execution environment or saving a state of the second execution environment to a device shadow.

Clause 45. The computer-implemented method of Clause 43 further comprising:
enqueing a call to resume an execution the second execution environment within the queue; and
processing the queue based at least in part on an availability of the compute resources to select the call to resume the execution of the second execution environment; and
resuming the execution of the second execution environment.

Clause 46. A coordinator computing device implementing a communication manager enabling communications between executions of tasks on the coordinator computing device, wherein the coordinator computing devices is configured to manage one or more coordinated devices within a coordinated environment, the system comprising:
a non-transitory data store including computer executable instructions corresponding to the communication manager that, when executed, enables communication between tasks execution on the coordinator computing device, wherein individual tasks of correspond to code executable by the coordinator computing device to manage operation of the one or more coordinated devices;
a processor in communication with the non-transitory data store and configured to execute the communication manager, wherein execution of the communication manager causes the processor to:
obtain a call message from an execution of a first task on the coordinator computing device, wherein the call message is addressed to a resource identifier associated with a second task, and wherein the call message includes parameters to be passed to an execution of the second task;

identify the second task from at least the resource identifier to which the call message is addressed;
cause execution of the second task on the coordinator computing device;
transmit an execution identifier to the execution of the second task;
obtain a return message from the execution of the second task, wherein the return message specifies the execution identifier;
identify the return message as an output of the execution of the second task based at least in part on the resource identifier including the execution identifier; and
return the output of the execution of the second task to the execution of the first task.

Clause 47. The coordinator computing device of Clause 46, wherein at least one of the call message or the return message are a hypertext transport protocol (HTTP) message.

Clause 48. The coordinator computing device of Clause 46, wherein the processor is further configured to generate execution environments for the respective executions of the first task and of the second task, and wherein the execution environments are isolated from one another.

Clause 49. The coordinator computing device of Clause 46, wherein execution of the communication manager further causes the processor to validate security information within the call message.

Clause 50. The coordinator computing device of Clause 46, wherein the return message specifies the execution identifier by including the execution identifier in at least one of an address to which the return message is transmitted or a header field of the return message.

Clause 51. Non-transitory computer readable media including instructions executable by a coordinator computing device to implement a communication manager enabling communications between executions of tasks on the coordinator computing device, wherein individual tasks of correspond to code executable by the coordinator computing device to manage operation of the one or more coordinated devices, and wherein execution of the instructions causes the coordinator computing device to:
obtain a call message from an execution of a first task on the coordinator computing device, wherein the call message is addressed to a resource identifier associated with a second task;
identify the second task from at least the resource identifier to which the call message is addressed;
cause execution of the second task on the coordinator computing device;
obtain a return message from the execution of the second task, wherein the return message includes an execution identifier associated with the execution of the second task;
identify the return message as an output of the execution of the second task based at least in part on the resource identifier including the execution identifier; and
return the output of the execution of the second task to the execution of the first task.

Clause 52. The non-transitory computer readable media of Clause 51, wherein execution of the instructions further causes the coordinator computing device to obtain a return request message from the execution of the first task, and wherein the output of the execution of the second task is returned to the execution of the first task in response to the return request message.

Clause 53. The non-transitory computer readable media of Clause 52, wherein the return request message is addressed to the resource identifier including the execution identifier.

Clause 54. The non-transitory computer readable media of Clause 52, wherein the return request message is obtained prior to obtaining the return message.

Clause 55. The non-transitory computer readable media of Clause 52, wherein the call message includes a priority to be assigned to the execution of the second task.

Clause 56. The non-transitory computer readable media of Clause 52, wherein the resource identifier associated with the second task includes a domain name associated with the coordinator computing device, a port associated with the communication manager, and a path associated with the second task.

Clause 57. The non-transitory computer readable media of Clause 52, wherein the resource identifier associated with the second task is a uniform resource identifier.

Clause 58. The non-transitory computer readable media of Clause 52, wherein the first task correspond and the second task are the same task.

Clause 59. A computer-implemented method to enable communication between executions of tasks on the coordinator computing device, wherein individual tasks of correspond to code executable by the coordinator computing device, the computer-implemented method comprising:
obtaining a call message from an execution of a first task on the coordinator computing device, wherein the call message is addressed to a resource identifier associated with a second task;
identifying the second task from at least the resource identifier to which the call message is addressed;
causing execution of the second task on the coordinator computing device;
obtaining a return message from the execution of the second task, wherein the return message includes an execution identifier associated with the execution of the second task;
identifying the return message as an output of the execution of the second task based at least in part on the resource identifier including the execution identifier; and
returning the output of the execution of the second task to the execution of the first task.

Clause 60. The computer-implemented method of Clause 59 further comprising at least one of assigning the execution identifier to the execution of the second task or identifying, within the call message, the execution identifier.

Clause 61. The computer-implemented method of Clause 59 further comprising passing the execution identifier to the execution of the second task.

Clause 62. The computer-implemented method of Clause 59, wherein causing execution of the second task on the coordinator computing device comprises generating an execution environment for the execution of the second task on the coordinator computing device.

Clause 63. The computer-implemented method of Clause 59, wherein returning the output of the execution of the second task to the execution of the first task comprises returning the output as a push message to the first task.

Clause 64. The computer-implemented method of Clause 59, wherein the first task corresponds to code of a first programming language and the second task corresponds to code of a second programming language.

Clause 65. The computer-implemented method of Clause 59 further comprising obtaining a return request message from the execution of the first task, wherein the output of the execution of the second task is returned to the execution of the first task in response to the return request message.

Clause 66. The computer-implemented method of Clause 59, wherein the return request message is obtained prior to obtaining the return message.

Clause 67. A coordinator computing device implementing a remote interface enabling remote invocation of tasks on the coordinator computing device, wherein the coordinator computing device is configured to manage one or more coordinated devices within a coordinated environment, and wherein individual tasks correspond to code executable by the coordinator computing device to manage operation of the one or more coordinated devices, the coordinator computing device comprising:
a non-transitory data store including computer executable instructions corresponding to the remote interface that, when executed, enables remote invocation of tasks on the coordinator computing device;
a processor in communication with the non-transitory data store and configured to execute the remote interface, wherein execution of the remote interface causes the processor to:
transmit a query to an on-demand code execution environment remote from the coordinator computing device to obtain a call to execute a first task on the coordinator computing device, wherein the query is addressed to a resource identifier associated with a queue of calls to the coordinator computing device maintained at the on-demand code execution environment;
obtain the call to execute the first task on the coordinator computing device, wherein the call includes parameters to be passed to an execution of the second task;
determine a resource identifier associated with a second task and the coordinator computing device; and
generate a call message corresponding to the call to execute the first task on the coordinator computing device, wherein the call message is addressed to the resource identifier associated with the second task, wherein the call message includes the parameters to be passed to an execution of the second task, and wherein the call message causes execution of the first task on the coordinator computing device.

Clause 68. The system of Clause 67, wherein execution of the remote interface further causes the processor to:
obtain an execution identifier corresponding to the execution of the second task;
obtain a return message from the execution of the second task, wherein the message is addressed to a resource identifier including the execution identifier;
identify the return message as an output of the execution of the second task based at least in part on the resource identifier including the execution identifier; and
return the output of the execution of the second task to on-demand code execution environment.

Clause 69. The system of Clause 68, wherein execution of the remote interface causes the processor to obtain the execution identifier by at least one of generating the execution identifier or detecting the execution identifier within the call to execute the first task.

Clause 70. The coordinator computing device of Clause 67, wherein the call message is a hypertext transport protocol (HTTP) message addressed to the resource identifier associated with the second task.

Clause 71. Non-transitory computer readable media including instructions executable by a coordinator computing device to implement a remote interface enabling remote invocation of tasks on the coordinator computing device, wherein individual tasks correspond to code executable by the coordinator computing device to manage operation of the one or more coordinated devices, and wherein execution of the instructions causes the coordinator computing device to:
transmit a query to an on-demand code execution environment, remote from the coordinator computing device, for a call to execute a first task on the coordinator computing device, wherein the query is addressed to a resource identifier associated with a queue of calls to the coordinator computing device maintained at the on-demand code execution environment;
obtain the call to execute the first task on the coordinator computing device;
determine a resource identifier associated with a second task and the coordinator computing device; and
generate a call message corresponding to the call to execute the first task on the coordinator computing device, wherein the call message is addressed to the resource identifier associated with the second task.

Clause 72. The non-transitory computer readable media of Clause 71, wherein execution of the instructions further causes the coordinator computing device to:
obtain a return message from the execution of the second task, wherein the message is addressed to a resource identifier including an execution identifier corresponding to the execution of the second task;
identify the return message as an output of the execution of the second task based at least in part on the resource identifier including the execution identifier; and
return the output of the execution of the second task to on-demand code execution environment.

Clause 73. The non-transitory computer readable media of Clause 71, wherein execution of the instructions causes the coordinator computing device to return the output of the execution of the second task to on-demand code execution environment at least partly by transmitting the output to a second resource identifier, on the on-demand code execution environment, including the execution identifier.

Clause 74. The non-transitory computer readable media of Clause 71, wherein execution of the instructions causes the coordinator computing device to:
generate a return request message addressed to the resource identifier including the execution identifier corresponding to the execution of the second task; and
transmit the return request message to the resource identifier.

Clause 75. The non-transitory computer readable media of Clause 71, wherein the call message includes a priority to be assigned to the execution of the second task.

Clause 76. The non-transitory computer readable media of Clause 71, wherein the resource identifier associated with the second task and the coordinator computing device includes a domain name associated with the coordinator computing device, a port associated with the communication manager, and a path associated with the first task.

Clause 77. The non-transitory computer readable media of Clause 71, wherein the resource identifier associated with the second task is a uniform resource identifier.

Clause 78. The non-transitory computer readable media of Clause 71, wherein execution of the instructions causes the coordinator computing device to generate an execution environment for execution of the first task to execute the first task within the execution environment.

Clause 79. A computer-implemented method implemented by a coordinator computing device to enable remote invocation of tasks on the coordinator computing device, wherein individual tasks of correspond to code executable by the coordinator computing device, the computer-implemented method comprising:
  transmitting a query to an on-demand code execution environment, remote from the coordinator computing device, for a call to execute a first task on the coordinator computing device, wherein the query is addressed to a resource identifier associated with a queue of calls to the coordinator computing device maintained at the on-demand code execution environment;
  obtaining the call to execute the first task on the coordinator computing device;
  determining a resource identifier associated with a second task and the coordinator computing device; and
  generating a call message corresponding to the call to execute the first task on the coordinator computing device, wherein the call message is addressed to the resource identifier associated with the second task.

Clause 80. The computer-implemented method of Clause 79 further comprising at least one of assigning an execution identifier to an execution of the first task or identifying, within the call, the execution identifier.

Clause 81. The computer-implemented method of Clause 80, wherein the call message includes the execution identifier.

Clause 82. The computer-implemented method of Clause 79 further comprising executing the first task on the coordinator computing device in response to the call message, wherein comprising executing the first task on the coordinator computing device comprises generating an execution environment for execution of the first task on the coordinator computing device.

Clause 83. The computer-implemented method of Clause 79 further comprising:
  obtaining a return message from an execution of the first task, wherein the message is addressed to a resource identifier including an execution identifier corresponding to the execution of the first task;
  identifying the return message as an output of the execution of the first task based at least in part on the resource identifier including the execution identifier; and
  returning the output of the execution of the second task to on-demand code execution environment.

Clause 84. The computer-implemented method of Clause 83 further comprising generating a return request message and transmitting the return request message to the resource identifier including the execution identifier corresponding to the execution of the first task.

Clause 85. The computer-implemented method of Clause 83, wherein returning the output of the execution of the second task to on-demand code execution environment comprises transmitting the output to a second resource identifier, on the on-demand code execution environment, including the execution identifier.

Clause 86. The computer-implemented method of Clause 79, wherein generating the call message comprises decapsulating the call message from to the obtained call.

Clause 87. A coordinator computing device configured to manage one or more coordinated devices within a coordinated environment, the coordinator computing device comprising:
  a non-transitory data store including:
    one or more tasks to manage operation of the one or more coordinated devices, wherein individual tasks correspond to code executable by the coordinator computing device; and
    event flow information designating an action to be taken by the coordinator computing device in response to input by a first coordinated device of the one or more coordinated devices; and
  a processor in communication with the non-transitory data store, the processor configured with computer-executable instructions to:
    obtain a configuration package for the coordinator computing device, the configuration package identifying the one or more coordinated devices and the one or more tasks;
    retrieve the one or more tasks, as identified in the configuration package, from a network-accessible data store;
    store the one or more tasks in the non-transitory data store;
    obtain the input first coordinated device;
    identify, based at least in part on the event flow information, a first task of the one or more tasks to be executed in response to the input;
    generate an execution environment corresponding to the first task; and
    execute the first task in the execution environment.

Clause 88. The system of Clause 87, wherein the processor is further configured with computer-executable instructions to:
  obtain an output of an execution of the first task;
  identify, based at least in part on the event flow information, a coordinated device of the one or more coordinated devices, to which to transmit the output; and
  transmit the output to the coordinated device.

Clause 89. The system of Clause 88, wherein the output is transmitted as an MQTT notification.

Clause 90. The system of Clause 87, wherein the one or more coordinated devices comprise at least one of a general purpose computing device, a thin device, or an embedded device associated with an alternative primary function.

Clause 91. Non-transitory computer readable media comprising instructions to manage one or more coordinated devices within a coordinated environment that, when executed by a coordinator computing device associated with the coordinated environment, cause the coordinator computing device to:
obtain a configuration package for the coordinator computing device, the configuration package identifying the one or more coordinated devices, one or more tasks to manage operation of the one or more coordinated devices, wherein individual tasks correspond to code executable by the coordinator computing device, and event flow information designating an action to be taken by the coordinator computing device in response to input by a first coordinated device of the one or more coordinated devices;
retrieve the one or more tasks, as identified in the configuration package, from a network-accessible data store;
obtain the input first coordinated device;
identify, from at least the event flow information, a first task of the one or more tasks to be executed in response to the input;
generate an execution environment corresponding to the first task; and
execute the first task in the execution environment.

Clause 92. The non-transitory computer readable media of Clause 91, wherein the instructions, when executed, cause the coordinator computing device to:
obtain an output message from the first task;
reference the event flow information to identify at least one of a second task or a second coordinated device to which to transmit the output message; and
transmit the output message to at least one of the second task or second coordinated device.

Clause 93. The non-transitory computer readable media of Clause 92, wherein the instructions, when executed, cause the coordinator computing device to pass the output message to a router task executed on the coordinator computing device, and wherein the router task is executable to reference the event flow information to identify the at least one second task or second coordinated device.

Clause 94. The non-transitory computer readable media of Clause 91, wherein the instructions, when executed, cause the coordinator computing device to generate the execution environment as a container isolated from execution environments of other tasks on the coordinator computing device.

Clause 95. The non-transitory computer readable media of Clause 94, wherein the instructions, when executed, cause the coordinator computing device to provision the execution environment with access to a data resource required for execution of the first task.

Clause 96. The non-transitory computer readable media of Clause 91, wherein the instructions, when executed, cause the coordinator computing device to:
subscribe to a device shadow service indicating a desired state of the coordinator computing device; and
obtain a notification that the desired state has been modified at the device shadow service;
wherein the instructions, when executed, cause the coordinator computing device to obtain the configuration package in response to the notification that the desired state has been modified.

Clause 97. The non-transitory computer readable media of Clause 91, wherein the instructions, when executed, cause the coordinator computing device to:
enqueue a call to the first task in a work item queue; and
apply a scheduling algorithm to the work item queue to select the first task for dequeuing from the work item queue.

Clause 98. The non-transitory computer readable media of Clause 91, wherein the first task is a shadow service task executable to cause the coordinator computing device to:
determine a desired state of the first coordinated device;
modify a device shadow of the first coordinated device to indicate the desired state; and
transmit a notification to the first coordinated device of the desired state.

Clause 99. The non-transitory computer readable media of Clause 91, wherein the notification to the first coordinated device is transmitted in response to a subscription by the first coordinated device to a topic corresponding to the device shadow.

Clause 100. A computer-implemented method implemented by a coordinator computing device to manage one or more coordinated devices within a coordinated environment, the computer-implemented method comprising:
obtaining a configuration package for the coordinator computing device, the configuration package identifying the one or more coordinated devices, one or more tasks to manage operation of the one or more coordinated devices, wherein individual tasks correspond to code executable by the coordinator computing device, and event flow information designating an action to be taken by the coordinator computing device in response to input by a first coordinated device of the one or more coordinated devices;
retrieving the one or more tasks, as identified in the configuration package, from a network-accessible data store;
obtaining the input first coordinated device;
identifying, from at least the event flow information, a first task of the one or more tasks to be executed in response to the input;
generating an execution environment corresponding to the first task; and
executing the first task in the execution environment.

Clause 101. The computer-implemented method of Clause 100 further comprising:
obtaining an output message from the first task;
referencing the event flow information to identify at least one of a second task or a second coordinated device to which to transmit the output message; and
transmitting the output message to at least one of the second task or second coordinated device.

Clause 102. The computer-implemented method of Clause 101, wherein referencing the event flow information to identify at least one of the second task or the second coordinated device to which to transmit the output comprises passing the output message to a router task executed on the coordinator computing device, and wherein the router task is executable to reference the event flow table to identify the at least one second task or second coordinated device.

Clause 103. The computer-implemented method of Clause 100, wherein generating the execution environment corresponding to the first task comprises generating a container isolated from execution environments of other tasks on the coordinator computing device.

Clause 104. The computer-implemented method of Clause 100 further comprising provisioning the execution environment with access to a data resource required for execution of the first task.

Clause 105. The computer-implemented method of Clause 100 further comprising:
- subscribing to a device shadow service indicating a desired state of the coordinator computing device; and
- obtaining a notification that the desired state has been modified at the device shadow service;
- wherein obtaining a configuration package occurs based at least in part on the notification.

Clause 106. The computer-implemented method of Clause 100 further comprising:
- determining a desired state of the first coordinated device;
- modifying a device shadow of the first coordinated device to indicate the desired state; and
- transmitting a notification to the first coordinated device of the desired state.

While various functionalities may be described above independently, it is contemplated that these functionalities may be implemented both independently or in any combination. Moreover, it is contemplated that these functionalities may be combined with functionalities, devices, or environments described in the Related Applications, incorporated by reference above. For example, a coordinator computing device as described herein may implement subject matter described in the Related Applications to enable interpretation of received messages (e.g., MQTT messages from coordinated devices) to determine a subset of devices or tasks that the messages should be forward to, potentially by use of specialized message topics. As a further example, a coordinator computing device may further utilize security information included within received messages (e.g., from coordinated devices or task executions) to determine whether messages should be forwarded between recipients. As yet another example, a coordinator computing device may enable the use of embedded codes within messages (e.g., within a topic field) to enable variable handling of messages, potentially without requiring inspection of a message body. One of skill in the art will appreciate, in light of the present disclosure, that many combinations of the functionalities described herein are possible.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A coordinator computing device implementing a communication manager enabling communications between executions of tasks on the coordinator computing device, wherein the coordinator computing device is configured to manage one or more coordinated devices within a coordinated environment, the system comprising:
- a non-transitory data store including computer executable instructions corresponding to the communication manager that, when executed, enables communication between tasks executions on the coordinator computing device, wherein individual tasks correspond to code executable by the coordinator computing device to manage operation of the one or more coordinated devices;
- a processor in communication with the non-transitory data store and configured to execute the communication manager, wherein execution of the communication manager causes the processor to:
  - obtain a call message from an execution of a first task on the coordinator computing device, wherein the call message is addressed to a resource identifier associated with a second task, and wherein the call message includes parameters to be passed to an execution of the second task;
  - identify the second task from at least the resource identifier to which the call message is addressed;
  - cause execution of the second task on the coordinator computing device;
  - transmit an execution identifier to the execution of the second task, wherein the execution identifier identifies the execution of the second task, as distinct from other executions of the second task;

obtain a return message from the execution of the second task, wherein the return message specifies the execution identifier;

obtain a return request message from the execution of the first task, wherein the return request message requests an output of the execution of the second task and specifies the execution identifier;

identify the return message as the output of the execution of the second task requested in the return request message based at least in part on matching the execution identifier, as included within the return message, with the execution identifier as included within the return request message; and return the output of the execution of the second task to the execution of the first task.

2. The coordinator computing device of claim 1, wherein at least one of the call message or the return message are a hypertext transport protocol (HTTP) message.

3. The coordinator computing device of claim 1, wherein the processor is further configured to generate execution environments for the respective executions of the first task and of the second task, and wherein the execution environments are isolated from one another.

4. The coordinator computing device of claim 1, wherein execution of the communication manager further causes the processor to validate security information within the call message.

5. The coordinator computing device of claim 1, wherein the return message specifies the execution identifier by including the execution identifier in at least one of an address to which the return message is transmitted or a header field of the return message.

6. Non-transitory computer readable media including instructions executable by a coordinator computing device to implement a communication manager enabling communications between executions of tasks on the coordinator computing device, wherein individual tasks of correspond to code executable by the coordinator computing device to manage operation of the one or more coordinated devices, and wherein execution of the instructions causes the coordinator computing device to:

obtain a call message from an execution of a first task on the coordinator computing device, wherein the call message is addressed to a resource identifier associated with a second task;

identify the second task from at least the resource identifier to which the call message is addressed;

cause execution of the second task on the coordinator computing device;

obtain a return message from the execution of the second task, wherein the return message includes an execution identifier associated with the execution of the second task and wherein the execution identifier identifies the execution of the second task, as distinct from other executions of the second task;

obtain a return request message from the execution of the first task, wherein the return request message requests an output of the execution of the second task and specifies the execution identifier;

identify the return message as the output of the execution of the second task requested in the return request message based at least in part on matching the execution identifier, as included within the return message, with the execution identifier as included within the return request message; and return the output of the execution of the second task to the execution of the first task.

7. The non-transitory computer readable media of claim 6, wherein the return request message is obtained prior to obtaining the return message.

8. The non-transitory computer readable media of claim 6, wherein the call message includes a priority to be assigned to the execution of the second task.

9. The non-transitory computer readable media of claim 6, wherein the resource identifier associated with the second task includes a domain name associated with the coordinator computing device, a port associated with the communication manager, and a path associated with the second task.

10. The non-transitory computer readable media of claim 6, wherein the resource identifier associated with the second task is a uniform resource identifier.

11. The non-transitory computer readable media of claim 6, wherein the first task and the second task are the same task.

12. A computer-implemented method to enable communication between executions of tasks on the coordinator computing device, wherein individual tasks of correspond to code executable by the coordinator computing device, the computer-implemented method comprising:

obtaining a call message from an execution of a first task on the coordinator computing device, wherein the call message is addressed to a resource identifier associated with a second task;

identifying the second task from at least the resource identifier to which the call message is addressed;

causing execution of the second task on the coordinator computing device;

obtaining a return message from the execution of the second task, wherein the return message includes an execution identifier associated with the execution of the second task, and wherein the execution identifier identifies the execution of the second task, as distinct from other executions of the second task;

obtaining a return request message from the execution of the first task, wherein the return request message requests an output of the execution of the second task and specifies the execution identifier;

identifying the return message as the output of the execution of the second task requested in the return request message based at least in part on matching the execution identifier, as included within the return message, with the execution identifier as included within the return request message; and returning the output of the execution of the second task to the execution of the first task.

13. The computer-implemented method of claim 12 further comprising at least one of assigning the execution identifier to the execution of the second task or identifying, within the call message, the execution identifier.

14. The computer-implemented method of claim 12 further comprising passing the execution identifier to the execution of the second task.

15. The computer-implemented method of claim 12, wherein causing execution of the second task on the coordinator computing device comprises generating an execution environment for the execution of the second task on the coordinator computing device.

16. The computer-implemented method of claim 12, wherein returning the output of the execution of the second task to the execution of the first task comprises returning the output as a push message to the first task.

17. The computer-implemented method of claim 12, wherein the first task corresponds to code of a first programming language and the second task corresponds to code of a second programming language.

18. The computer-implemented method of claim 12, wherein the return request message is obtained prior to obtaining the return message.

\* \* \* \* \*